United States Patent
Schotland et al.

(10) Patent No.: US 7,034,303 B2
(45) Date of Patent: Apr. 25, 2006

(54) SYSTEM AND METHOD OF IMAGE RECONSTRUCTION FOR OPTICAL TOMOGRAPHY WITH LIMITED DATA

(75) Inventors: John Carl Schotland, Merion, PA (US); Vadim Arkadievich Markel, Richmond Heights, MO (US)

(73) Assignee: Washington University, St. Louis, MO (US)

( * ) Notice: Subject to any disclaimer, the term of this patent is extended or adjusted under 35 U.S.C. 154(b) by 266 days.

(21) Appl. No.: 10/608,332

(22) Filed: Jun. 27, 2003

(65) Prior Publication Data
US 2004/0262520 A1  Dec. 30, 2004

(51) Int. Cl.
*G01J 5/02* (2006.01)
(52) U.S. Cl. .................................. 250/341.1
(58) Field of Classification Search ............. 250/341.1; 600/425
See application file for complete search history.

(56) References Cited

U.S. PATENT DOCUMENTS

| | | | |
|---|---|---|---|
| 5,747,810 A | * | 5/1998 | Schotland ................ 250/358.1 |
| 5,905,261 A | | 5/1999 | Schotland et al. |
| 5,953,388 A | * | 9/1999 | Walnut et al. ................ 378/4 |

\* cited by examiner

*Primary Examiner*—Constantine Hannaher
(74) *Attorney, Agent, or Firm*—Thompson Coburn LLP

(57) ABSTRACT

A methodology and concomitant system for the reconstruction of an object from measurements of the transmitted intensity of scattered radiation effected by irradiating the object with a source of radiation. The measurements of the transmitted intensity are both spatially sampled and limited. The transmitted intensity is related to either the absorption coefficient or diffusion coefficient, or both, of the object by an integral operator. The image is directly reconstructed by executing a prescribed mathematical algorithm, as determined with reference to the integral operator, on the transmitted intensity of the scattered radiation. In a preferred embodiment, the data is measured using a paraxial arrangement composed on a single source and a small number of on-axis and off-axis detectors with the arrangement being moved over the measurement surface to measure the set of sampled and limited data.

18 Claims, 7 Drawing Sheets

SYSTEM AND METHOD OF IMAGE RECONSTRUCTION FOR OPTICAL TOMOGRAPHY WITH LIMITED DATA

BACKGROUND OF THE DISCLOSURE

1.) Field of the Invention

This invention relates to tomography and, more particularly, to a method and concomitant system wherein an image of an object is directly reconstructed from measurements of scattered radiation using a limited set of data for reconstruction.

2.) Description of the Background Art

The inventive subject matter addresses the physical principles and the associated mathematical formulations underlying the direct reconstruction method for optical imaging in the multiple scattering regime. Methodologies for the direct solution to the image reconstruction problem result. Moreover, the methodologies are generally applicable to imaging with any scalar wave in the diffusive multiple scattering regime and are not limited to optical imaging. However, for the sake of elucidating the significant ramifications of the present inventive subject matter, it is most instructive to select one area of application of the methodologies so as to insure a measure of definiteness and concreteness to the description. Accordingly, since many biological systems meet the physical requirements for the application of the principles of the present invention, especially photon diffusion imaging principles, the fundamental aspects of the present inventive subject matter are conveyed using medical imaging as an illustrative application of the methodologies.

There have been three major commericial developments in medical imaging that have aided in the diagnosis and treatment of numerous medical conditions, particularly as applied to the human anatomy; these developments are: (1) the Computer-Assisted Tomography (CAT) scan; (2) the Magnetic Resonance Imaging (MRI); and (3) the Positron Emission Tomography (PET) scan.

With a CAT scanner, X-rays are transmitted through, for example, a human brain, and a computer uses X-rays detected external to the human head to create and display a series of images-basically cross-sections of the human brain. What is being imaged is the X-ray absorption function for unscattered, hard X-rays within the brain. CAT scans can detect, for instance, strokes, tumors, and cancers. With an MRI device, a computer processes data from radio signals impinging on the brain to assemble life-like, three-dimensional images. As with a CAT scan, such malformations as tumors, blood clots, and atrophied regions can be detected. With a PET scanner, the positions of an injected radioactive substance are detected and imaged as the brain uses the substance. What is being imaged is the gamma ray source position. Each of these medical imaging techniques has proved invaluable to the detection and diagnosing of many abnormal medical conditions. However, in many respects, none of the techniques is completely satisfactory for the reasons indicated in the following discussion.

In establishing optimal design parameters for a medical imaging technique, the following four specifications are most important. The specifications are briefly presented in overview fashion before a more detailed discussion is provided; moreover, the shortcomings of each of the conventional techniques are also outlined. First, it would be preferable to use a non-ionizing source of radiation. Second, it would be advantageous to achieve spatial resolution on the order of a millimeter to facilitate diagnosis. Third, it would be desirable to obtain metabolic information. And, fourth, it would be beneficial to produce imaging information in essentially real-time (on the order of one millisecond) so that moving picture-like images could be viewed. None of the three conventional imaging techniques is capable of achieving all four specifications at once. For instance, a CAT scanner is capable of high resolution, but it uses ionizing radiation, it is not capable of metabolic imaging, and its spatial resolution is borderline acceptable. Also, while MRI does use non-ionizing radiation and has acceptable resolution, MRI does not provide metabolic information and is not particularly fast. Finally, a PET scanner does provide metabolic information, but PET uses ionizing radiation, is slow, and spatial resolution is also borderline acceptable. Moreover, the PET technique is invasive due to the injected substance.

The four specifications are now considered in more detail. With respect to ionizing radiation, a good deal of controversy as to its effects on the human body presently exists in the medical community. To ensure that the radiation levels are within what are now believed to be acceptable limits, PET scans cannot be performed at close time intervals (oftentimes, it is necessary to wait at least 6 months between scans), and the dosage must be regulated. Moreover, PET is still a research tool because a cyclotron is needed to make the positron-emitting isotopes. Regarding spatial resolution, it is somewhat self-evident that diagnosis will be difficult without the necessary granularity to differentiate different structures as well as undesired conditions such as blood clots or tumors. With regard to metabolic information, it would be desirable, for example, to make a spatial map of oxygen concentration in the human head, or a spatial map of glucose concentration in the brain. The ability to generate such maps can teach medical personnel about disease as well as normal functions. Unfortunately, CAT and MRI report density measurements—electrons in an X-ray scanner or protons in MRI—and there is not a great deal of contrast to ascertain metabolic information, that is, it is virtually impossible to distinguish one chemical (such as glucose) from another. PET scanners have the ability to obtain metabolic information, which suggests the reason for the recent popularity of this technique. Finally, imaging is accomplished only after a substantial processing time, so real-time imaging is virtually impossible with the conventional techniques.

Because of the aforementioned difficulties and limitations, there had been a major effort in the last ten years to develop techniques for generating images of the distribution of absorption and scattering coefficients of living tissue that satisfy the foregoing four desiderata. Accordingly, techniques using low intensity photons would be safe. The techniques should be fast in that optical events occur within the range of 100 nanoseconds—with this speed, numerous measurements could be completed and averaged to reduce measurement noise while still achieving the one millisecond speed for real-time imaging. In addition, source and detector equipment for the techniques may be arranged to produce necessary measurement data for a reconstruction procedure utilizing appropriately-selected spatial parameters to thereby yield the desired one millimeter spatial resolution. Finally, metabolic imaging with the techniques should be realizable if imaging as localized spectroscopy is envisioned in the sense that each point in the image is assigned an absorption spectrum. Such an assignment may be used, for example, to make a map of oxygenation by measuring the absorption spectra for hemoglobin at two different wavelengths, namely, a first wavelength at which hemoglobin is saturated, and a second wavelength at which hemoglobin is de-saturated. The difference of the measurements can yield a hemoglobin saturation map which can, in turn, give rise to tissue oxygenation information.

As a result of this recent effort, a number of techniques have been developed and patented which satisfy the four desiderata. Representative of the technique whereby both absorption and scattering coefficients are directly reconstructed is the methodology, and concomitant system, reported in U.S. Pat. No. 5,747,810 ("Simultaneous Absorption and Diffusion Tomography System and Method Using Direct Reconstruction of Scattered Radiation") having Schotland as the inventor (one of the inventors of the present inventive subject matter). In accordance with the broad aspect of the invention in '810, the object under study is irradiated by a continuous wave source at a given frequency and the transmitted intensity due predominantly to diffusively scattered radiation is measured at selected locations proximate to the object wherein the transmitted intensity is related to both the absorption and diffusion coefficients by an integral operator. The absorption and diffusion images of the object are directly reconstructed by executing a prescribed mathematical algorithm, determined with reference to the integral operator, on the transmitted intensity measurements. In addition, radiation at different wavelengths effects imaging as localized spectroscopy.

Another technique, covered in U.S. Pat. No. 5,905,261 ("Imaging System and Method Using Direct Reconstruction of Scattered Radiation" also having Schotland as one of the inventors) discloses and claims explicit inversion formulas obtained from the observation that it is possible to construct the singular value decomposition of the forward scattering operator within the diffusion approximation. In accordance with the broad aspect of '261 for imaging an object having variable absorption and diffusion coefficients, the object under study is irradiated and the transmission coefficient due predominantly to diffusively scattered radiation is measured at appropriate locations proximate to the object. The transmission intensity is related to the absorption and diffusion coefficients by an integral operator. An image representative of the object is directly reconstructed by executing a prescribed mathematical algorithm, determined with reference to the integral operator, on the transmission coefficient. The algorithm further relates the absorption and diffusion coefficients to the transmission coefficient by a different integral operator.

The art is devoid of techniques for dealing with: (1) effects of sampling, that is, placement of the sources and receivers in order to obtain sampled data, in the reconstruction process, as well as limiting the amount of data being processed; and (2) paraxial reconstruction wherein a single source is utilized to illuminate the object, with the scattered light being detected by an on-axis detector plus a small number of off-axis detectors, and then scanning the surface of the object with the source-detectors array while varying the frequency range of the source.

Moreover, whereas the prior art dealt with using data in a posterior manner to solve the fundamental integral operator relation devised by the prior art, the prior art is devoid of teachings and suggestion on the use of both sampled and limited data which are taken into account beforehand to solve the fundamental integral operator relation.

SUMMARY OF THE INVENTION

These and other shortcomings and limtations are obviated, in accordance with the present invention, by a method and concomitant system wherein only a limited and sampled set of data is measured and used to directly reconstruct an image of an object.

In accordance with a broad method aspect of the present invention, a method for generating an image of an object includes: (a) irradiating the object with a source of radiation, (b) measuring both a sampled and limited data set of transmitted intensities wherein said transmitted intensities are related to at least one coefficient characterizing the image by an integral operator, and (c) directly reconstructing the image by executing a prescribed mathematical algorithm, determined with reference to said integral operator, on said transmitted intensities.

In accordance with yet another broad method aspect of the present invention, the measuring includes measuring both the sampled and limited data set of transmitted intensities in a paraxial arrangement.

The organization and operation of this invention will be understood from a consideration of the detailed description of the illustrative embodiment, which follows, when taken in conjunction with the accompanying drawing.

BRIEF DESCRIPTION OF THE DRAWING

The same element appearing in more than one FIG. has the same reference numeral.

DETAILED DESCRIPTION

To place in perspective the detailed description of the present inventive subject matter and thereby highlight the departure from the art as disclosed and claimed herein, it is both instructive and informative to first gain a basic understanding of the imaging environment in which the present invention operates by presenting certain foundational principles pertaining to the subject matter in accordance with the present invention. Accordingly, the first part of the description focuses on a high-level discussion of the imaging systems relevant to the inventive subject matter; this approach has the advantage of introducing notation and terminology which will aid in elucidating the various detailed aspects of the present invention. After this overview, the system aspects of the present invention, as well as the concomitant methodology, are presented with specificity.

Overview of the Present Invention

The image reconstruction problem for optical tomography is considered in this disclosure. The effects of sampling and limited data on this inverse problem is elucidated and we derive an explicit inversion which is computationally efficient and stable in the presence of noise.

The propagation of near-infrared light in many biological tissues is characterized by strong multiple scattering and relatively weak absorption. Under these conditions, the transport of light can be regarded as occurring by means of diffusing waves. There has been considerable recent interest in the use of such waves for medical imaging. The physical problem under consideration is one of recovering the optical properties of the interior of an inhomogeneous medium (composed of, for example, an object or sample embedded in a homogeneous medium) from measurements taken on its surface. A fundamental question of substantial practical importance concerns the impact of limited data on this inverse scattering problem. This question arises since it is often not possible to measure all the data which is necessary to guarantee uniqueness or stability of a solution to the inverse problem. A related question is how to recover the properties of the medium with a certain spatial resolution. Hence, it is important to understand the effects of sampling of the measured data on the quality of reconstructed images.

Figure 1A:
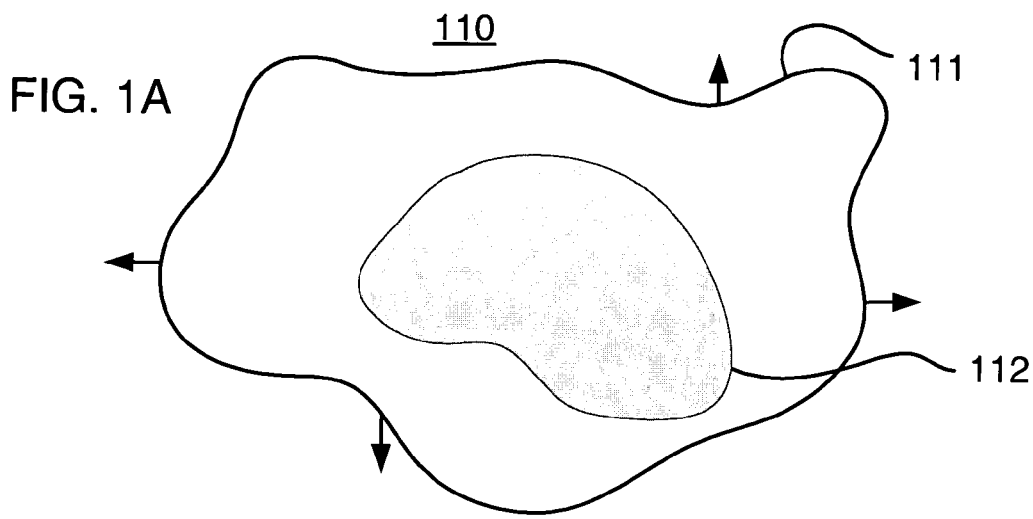
FIGS. 1A, 1B, and 1C are pictorial representations for the cases of complete data, sampled data, and both sampled and limited data, respectively.
Figure 1B:
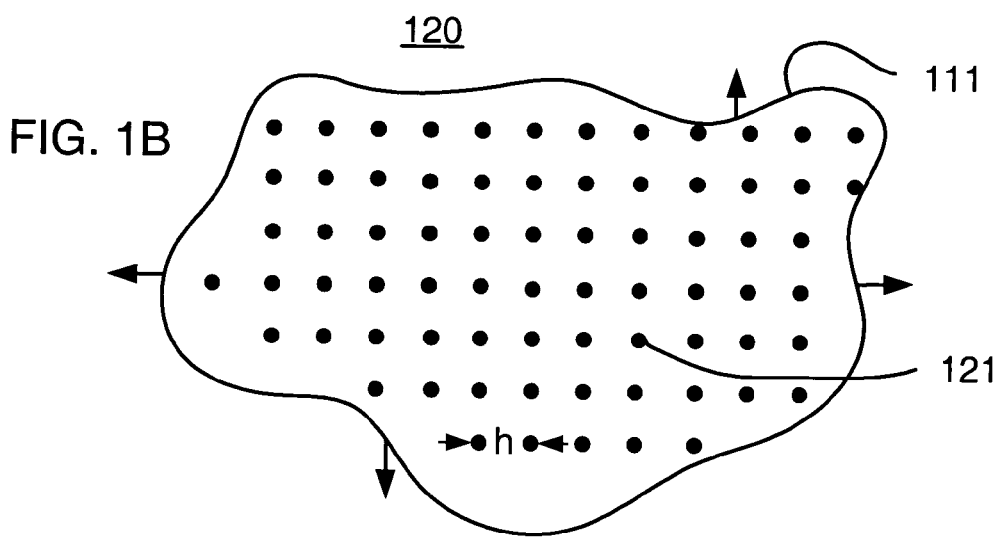
Figure 1C:
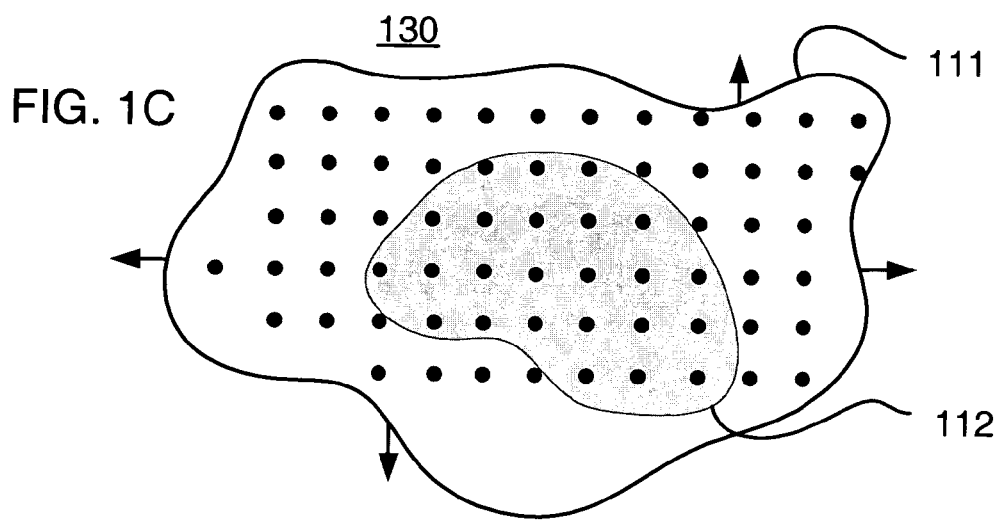

To further elucidate the general notions of both sampled and limited data, reference is made to FIGS. 1A–C. In the direct image reconstruction of the prior art, the presumption has been that data measurements resulted in so-called "complete data", that is, ideal data continuously measured spatially on the entire measurement surface(s). The pictorial representation 110 of FIG. 1A depicts this notion wherein there is a single but infinite planar measurement surface extending in each of the two dimensions—irregular shape 111 has outgoing arrows to depict the infinite extent of the planar representation. On the other hand, closed curve 112 depicts a limited region of the infinite planar surface over which measurements might be taken, that is, a finite aperature or window encompassed by closed curve 112.

In practice, data measurements by their very nature give rise to "incomplete data" such that data has finite precision and is spatially limited. FIG. 1B depicts case 120 wherein spatial data is "sampled", that is, data is taken only at specific points on the infinite surface—one such point is shown by reference numeral 121. Moreover, the specific arrangement of FIG. 1B is referred to in the sequel as a "lattice" with lattice spacing "h", that is, given a measurement point on the planar surface, said point is surrounded by four other points each a distance h away from the given point in the horizontal and vertical directions for the planar surface.

In addition, by combining the notions of the finite window of FIG. 1A and the sampled data of FIG. 1B, one arrives at the notion of both "limited and sampled data" case 130, which has the pictorial representation of FIG. 1C. Aperature 112 is shown to encompass a finite number of the sampled data points over the planar surface.

Figure 1D:
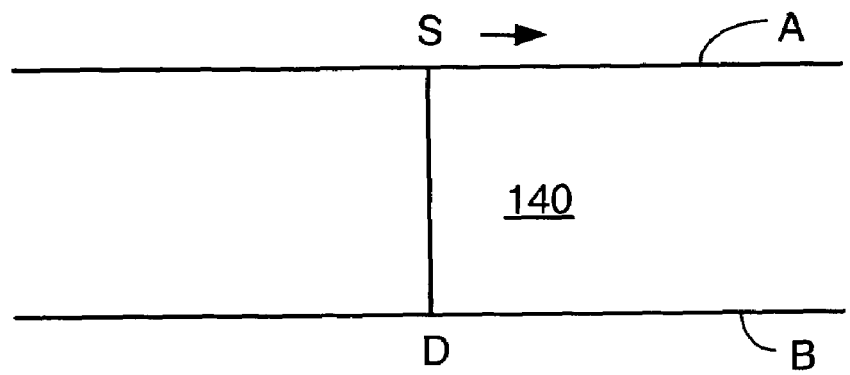
FIGS. 1D, 1E, and 1F illustrate the geometries corresponding to the axial, paraxial, and multiaxial cases of limited data, respectively.
Figure 1E:
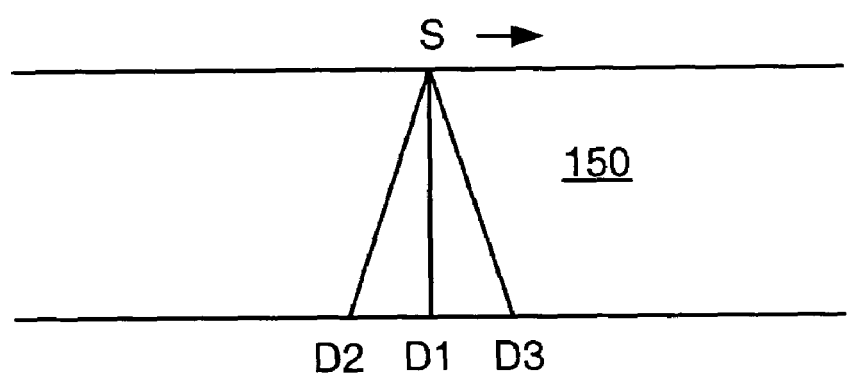
Figure 1F:
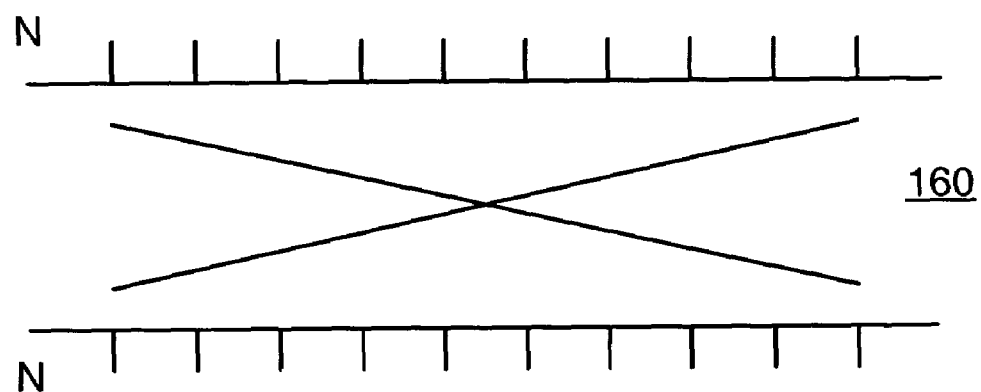

There are many possibe ways to obtain limited data, three of which are shown in FIGS. 1D–F, desribed as follows. In arrangement 140 of FIG. 1D, the so-called "axial" geometry is depicted. In this geometry, a single light source S is placed on surface A and scattered light data is collected on surface B which is on-axis with source A. The source is used to illuminate the medium between the surfaces, wherein the medium is presumed to be uniform in FIG. 1D. The source-detector pair is then moved to the next measurement point on the surfaces, and additional data is then collected—the arrow above surface A depicts the movement of the source-detector pair.

In arrangement 150 of FIG. 1E, a single source S is used to illuminate the medium, and the scattered light data is collected by an on-axis detector (D1) and a small number of off-axis detectors (two are shown as D2 and D3). The entire source-detector array is then scanned over N points on the surfaces, as indicated by the direction arrow. Moreover, it is often necessary to vary the frequency of the source over a specified range, resulting in O(N) spatial measurements, to obtain the requisite data for image recontruction. We refer to this method as "scanning paraxial optical tomography" which is discussed in much detail later.

Arrangement 160 of FIG. 1F depicts the "multi-axial" measurement arrangement wherein there are N harmonically related stationary point sources on surface A, and N point detectors on opposite surface B.

The physical problem to be solved in cases covered by FIGS. 1D–F is that of reconstructing the optical properties of the interior encompassed by the surfaces from the measurements taken on surface B. The combination of surface A and surface B is hereinafter called a planar "slab", so the problem to be solved may be stated as reconstructing the interior of the slab.

In the sequel, we show that the linearized form of the corresponding inverse scattering problem may be solved analytically by means of an explicit inversion formula. This result has three important consequences. First, by trading spatial information for frequency information, we obtain an image reconstruction algorithm that reduces the required number of spatial measurements of the scattered field from $O(N^2)$ to $O(N)$. Second, this algorithm has computational complexity that scales as $N \log N$ and is stable in the presence of added noise. This result should be compared with the $N^2 \log N$ scaling of the computational complexity of the complete-data problem of the prior art. Third, we explicitly account for the effects of sampling of the data, obtaining reconstructed images whose spatial resolution scales as the minimum separation between the sources.

In addition, when the sources and detectors are placed on a square lattice with lattice spacing h, it is possible to obtain a suitably defined solution to the reconstruction problem in the form of an explicit inversion formula. An important consequence of this result is that the fundamental limit of resolution in the transverse direction is the lattice spacing h. The resolution in the depth direction is determined by numerical precision and the level of noise in the measurements. Resolution is further controlled by the size of the aperature or window (which for the square lattice is definded by W=Nh) on which the data is taken.

As alluded to above, in the past decade there has been a steadily growing interest in the development of optical methods for biomedical imaging. The near-IR spectral region is of particular importance for such applications because of the presence of a "window of transparency" in the absorption spectrum of biological tissues between 600 and 800 nm. However, the propagation of near-IR radiation in tissue is characterized by strong multiple scattering which renders traditional imaging methods based on ray optics inapplicable. Instead, the propagation of electromagnetic radiation can be described by the radiative transport equation (hereinafter RTE) or by the diffusion equation (hereinafter DE). In both approaches, information about the phase of the electromagnetic wave is lost and the transport of light is characterized by the specific intensity $I(r,\hat{s})$ at the point r flowing in the direction $\hat{s}$. This description relies on a fundamental assumption, namely, that the intensity rather than the amplitude of the radiation field satisfies the superposition principle. An important consequence of this fact is that the specific intensity may be expressed in terms of the Green's function as follows:

$$I(r,\hat{s}) = \int G(r,\hat{s}; r',\hat{s}') S(r',\hat{s}') d^3r' d^2\hat{s}', \quad (1)$$

where $S(r,\hat{s})$ is an appropriate source function and we have assumed that the specific intensity is stationary in time.

In a typical experiment, light is injected into an inhomogeneous medium by one or more optical fibers which act as point sources. Additional fibers are employed for collection and subsequent detection of the transmitted light. Thus, if a source is located at the point $r_s$ and produces a narrow collimated incident beam in the direction $\hat{s}_s$, and the detector measures the specific intensity at the point $r_d$ flowing in the direction $\hat{s}_d$, the measurable quantity (up to a multiplicative constant proportional to the total power of the source and the efficiency of the detector) is the Green's function $G(r_s,\hat{s}_s; r_d,\hat{s}_d)$. The inverse problem of reconstructing the optical properties of the medium from multiple measurements of $G(r_s,\hat{s}_s; r_d,\hat{s}_d)$ is referred to as diffusion tomography (DT).

The approach that we will consider to the above inverse problem is based on the fact that G may be related to the optical properties of the medium. This dependence, which is known to be nonlinear, significantly complicates the inverse problem. Indeed, the Dyson equation for G can be written in operator form as $$G = G_0 - G_0 V G, \quad (2)$$

where $G_0$ is the Green's function for a homogeneous medium and V is the operator which describes the deviations of the optical properties of the medium from their background values. From the relation $G = (1 + G_0 V)^{-1} G_0$, it can be seen that G is a nonlinear function of V. It is possible to linearize the inverse problem under the assumption that the V is small, as is the case in many physical applications. The simplest approach is to use the first Born approximation which is given by $$G = G_0 - G_0 V G_0. \quad (3)$$

In this case the main equation of DT can be formulated as $$\Phi = G_0 V G_0, \quad (4)$$

where $\Phi = G_0 - G$ is the experimentally measurable data function. Note that other methods of linearization can also be used, leading to an equation of the form (4) with a modified expression for $\Phi$ (see section 2 below).

Since the right-hand side of (4) contains only the unperturbed Green's function $G_0$, the properties of $G_0$ are of primary importance. Although the functional form of $G_0$ can be quite complicated, as in the case of the RTE, some useful relations may be obtained from the underlying symmetry of the problem. Recently we have exploited the translational invariance of the unperturbed medium in the slab measurement geometry within the diffusion approximation. Several reconstruction algorithms have been proposed and numerically simulated. It was shown that taking account of translational invariance can result in a dramatic improvement of computational performance. In particular, it allows the performance of image reconstructions for data sets with a very large number of source detector pairs, a situation in which numerical reconstruction methods can not be used due to their high computational complexity. The effects of sampling and limited data have been studied and it was shown that the fundamental limit of transverse resolution is given by the step size of the lattice on which sources or detectors are placed. Therefore, a large number of source-detector pairs is required to achieve the highest possible spatial resolution.

Although many of the methods discussed in the literature may appear to be distinctly different, they are, in fact, special cases of a general family of inversion formulas which are based on certain symmetries of the unperturbed medium. The derivation of these results is, in some sense, independent of the use of diffusion approximation. Indeed, the only important property of the Green's function $G_0$ which is used is translational or rotational invariance. In a general curvilinear system of orthogonal coordinates $x_1, x_2, x_3$ invariance with respect to translation of one of the coordinates, say, $x_1$, can be mathematically expressed as $G_0(x_1, x_2, x_3; x'_1, x'_2, x'_3) = f(x_1 - x'_1; x_2, x_3; x'_2, x'_3)$ for some function $f$. Geometries in which translational invariance exists with respect to two coordinates are of particular interest. For example, in the slab measurement geometry discussed in section 3, $G_0$ is invariant with respect to translations parallel to the measurement plane; in the cylindrical measurement geometry which is discussed in section 3.4, $G_0$ is invariant with respect to rotations about and translations parallel to the cylinder axis.

This specification is organized as follows. In section 1 we review Green's functions in radiative transport and diffusion theory and their relation to the measurable signal. In section 2 several approaches to linearization of the integral equations of diffusion tomography are considered. The slab measurement geometry is considered in section 3. Here we discuss various particular cases, some of which have been implemented earlier, such as Fourier and paraxial tomography. In section 3.4 the cylindrical measurement geometry is considered. Finally, in section 4 we give calculate the kernels for the integral equations considered in this specification.

1 Green's Functions in Radiative Transport and Diffusion Theory

We assume that all sources are harmonically modulated at a frequency ω in the radio-frequency range (not to be confused with the electromagnetic frequency). This includes the continuous-wave (cw) regime ω=0. In this case all time-dependent quantities acquire the usual factor exp(−iωt), and the RTE in the frequency domain can be written as $$[\hat{s} \cdot \nabla + (\mu_t - i\omega/c)] I(r,\hat{s}) - \mu_s \int A(\hat{s}, \hat{s}') I(r,\hat{s}') d^2\hat{s}' = \epsilon(r,\hat{s}), \quad (5)$$

where $\mu_t = \mu_a + \mu_s$, $\mu_a$ and $\mu_s$ are the absorption and scattering coefficients and $A(\hat{s}, \hat{s}')$ is the scattering kernel with the properties $A(\hat{s}, \hat{s}') = A(\hat{s}', \hat{s})$ and $\int A(\hat{s}, \hat{s}') d^2\hat{s}' = 1$.

In radiative transport theory, it is customary to distinguish the diffuse and the reduced specific intensities, denoted $I_d$ and $I_r$, respectively. The reduced intensity satisfies $$\hat{s} \cdot \nabla I_r + (\mu_t - i\omega/c) I_r = \epsilon(r,\hat{s}) \quad (6)$$

and the boundary conditions $I_r = I_{inc}$ at the interface where the incident radiation with specific intensity $I_{inc}$ enters the scattering medium. The diffuse intensity $I_d$ satisfies $$[\hat{s} \cdot \nabla + (\mu_t - i\omega/c)] I_d(r,\hat{s}) - \mu_s \int A(\hat{s},\hat{s}') I_d(r,\hat{s}') d^2\hat{s}' = \epsilon_r(r,\hat{s}), \quad (7)$$

where the source term due to the reduced intensity, $\epsilon_r(r,\hat{s})$, is given by $$\epsilon_r(r,\hat{s}) = \mu_s \int A(\hat{s},\hat{s}') I_r(r,\hat{s}') d^2\hat{s}', \quad (8)$$

We will assume everywhere below that the ballistic component of the intensity given by $I_r$ at the location of detectors is negligibly small and will focus on the diffuse component descried by equation (7).

An inhomogeneous medium is characterized by the spatial distribution $\mu_a(r)=\mu_{a0}+\delta\mu_a(r)$ and $\mu_s(r)=\mu_{s0}+\delta\mu_s(r)$. Therefore, the Green's function for the RTE $G(r,\hat{s}; r',\hat{s}')$ satisfies the Dyson equation (2) with the operator V given by $V=\delta\mu_a+\delta\mu_s(1-\hat{A})$. The operator $\hat{A}$ with matrix elements $<r\hat{s}|A|r'\hat{s}'>=\delta(r-r')A(\hat{s},\hat{s}')$ is assumed to be position-independent. The unperturbed Green's function $G_0(r,\hat{s}; r',\hat{s}')$ satisfies $$[\hat{s}\cdot\nabla+(\mu_{t0}-i\omega/c)]G_0(r,\hat{s}; r',\hat{s}')-\mu_{s0}\int A(\hat{s},\hat{s}'')G_0(r,\hat{s}''; r',\hat{s}') d^2\hat{s}''=\delta(r-r')\delta(\hat{s}-\hat{s}'), \quad (9)$$

where $\mu_{t0}=\mu_{a0}+\mu_{s0}$.

The diffusion approximation is obtained by expanding $I_d(r,\hat{s})$ to first order in $\hat{s}$ (for nonzero modulation frequencies, an additional condition $\omega<<c/l^*$ must be fulfilled, where $l^*$ is defined below in (17)):

$$I_d(r, \hat{s}) = \frac{c}{4\pi}u(r) + \frac{3}{4\pi}J\cdot\hat{s}, \text{ where} \quad (10)$$

$$u(r) = \frac{1}{c}\int I_d(r,\hat{s})d^2\hat{s}, J(r) - \int \hat{s}I_d(r,\hat{s})d^2\hat{s}. \quad (11)$$

Then the density of electromagnetic energy u satisfies $$-\nabla\cdot[D(r)\nabla u(r)]+(\alpha(r)-i\omega)u(r)=S(r), \quad (12)$$

and the current J is given by $$J=-D\nabla u, \quad (13)$$

where the diffusion and absorption coefficients, D and $\alpha$, are given by $D=c/3[\mu_a+\mu_s(1-g)]$ and $\alpha=c\mu_a$, $g=\int\hat{s}\cdot\hat{s}'A(\hat{s},\hat{s}')d^2\hat{s}'$ is the assymetry parameter, and the source for the diffusion equation is given by $$S(r) = E(r) - \frac{3}{c}\nabla\cdot DQ(r), \quad (14)$$

$$E(r)=\int\epsilon_r(r,\hat{s})d^2\hat{s}, Q(r)=\int \hat{s}\epsilon_r(r,\hat{s})d^2\hat{s}. \quad (15)$$

The Green's function for the diffusion equation does not depend on the directions $\hat{s}$ and $\hat{s}'$ and we will denote its matrix elements as $G(r,r')$. The Green's function for the diffuse component of specific intensity can be obtained by applying the formula (10) to the electromagnetic energy density $u(r)=\int G(r,r')S(r')d^3r'$. Here the source term for the DE must be evaluated using equations (14), (15). For a point unidirectional source $\epsilon(r,\hat{s})=\delta(r-r_0)\delta(\hat{s}-\hat{s}_0)$ one can easily find that $E(r)=\mu_s\Theta[\hat{s}_0\cdot(r-r_0)]\exp[-\mu_s\hat{s}_0\cdot(r-r_0)]\delta[r-\hat{s}_0(\hat{s}_0\cdot r)-r_0+\hat{s}_0(\hat{s}_0\cdot r)]$ and $Q(r)=gE(r)\hat{s}_0$, where $\Theta$ is the step function and we have used the condition $\omega<<c/l^*$. With the additional assumptions that the diffusion coefficient is homogeneous in the regions close to sources and detectors and $g<<1$, the Green's function for the diffuse component can be written in source-detector reciprocal form as $$G(r, \hat{s}; r', \hat{s}') = \frac{c}{4\pi}(1+l^*\hat{s}\cdot\nabla_r)(1-l^*\hat{s}'\cdot\nabla_{r'})G(r,r'), \quad (16)$$

where $$l^*=3D_0/c. \quad (17)$$

Note that the first argument of $G(r,\hat{s}; r',\hat{S}')$ corresponds to the location of the source and the second to the detector. Interchange of the source and detector positions will result in a simultaneous change of sign of $\hat{s}$ and $\hat{s}'$, so that the above expression conserves source-detector reciprocity. If we assume that the source and detector positions are on the surface S, the above equation can be simplified with the use of general boundary conditions for the diffusion equation which are of the form $$(u+l\hat{n}\cdot\nabla u)|_{r\in S}=0, \quad (18)$$

where l is the extrapolation distance and $\hat{n}$ is an outward unit normal to the surface at the point r. The Green's function $G(r,r')$ must satisfy this boundary condition with respect to both of its arguments, from which it follows that $$G(r,\hat{s}; r',\hat{s}')|_{r,r'\in S} = \frac{c}{4\pi}\left(1-\frac{l^*}{l}\hat{s}\cdot\hat{n}\right)\left(1+\frac{l^*}{l}\hat{s}'\cdot\hat{n}'\right)G(r,r'). \quad (19)$$

We further assume that the source and detector optical fibers are oriented perpendicular to the measurement surface. Then $\hat{s}\cdot\hat{n}=-1$ for the source and $\hat{s}'\cdot\hat{n}'=1$ for the detector. Consequently, equation (19) takes the form $$G(r,\hat{s}; r',\hat{s}')|_{r,r'\in S} = \frac{c}{4\pi}\left(1+\frac{l^*}{l}\right)^2 G(r,r'). \quad (20)$$

Thus, the Green's function for the RTE has been expressed in terms of the Green's function for the DE and the parameters l and $l^*$. Note that in the limit $l\to 0$ (purely absorbing boundaries), the quantity in the right-hand side of (20) stays finite since $G(r,r')$ goes to zero as $l^2$ for $r,r' \in S$ in this limit.

Inhomogeneities of the medium are described in the diffusion approximation by spatial fluctuations of the absorption and diffusion coefficients: $\alpha(r)=\alpha_0+\delta\alpha(r)$ and $D(r)=D_0+\delta D(r)$. The unperturbed Green's function satisfies $$(-D_0\nabla^2+\alpha_0-i\omega)G_0(r,r')=\delta(r-r'), \quad (21)$$

and the full Green's function G of the Dyson equation (2) with the interaction operator given by $$V=\delta\alpha(r)-\nabla\cdot\delta D(r)\nabla. \quad (22)$$

2 Linearization

In this section we discuss linearization of integral equations for the unknown operator V. For simplicity, we discuss the $\hat{s}$-independent Green's function for the diffusion equation, $G(r,r')=<r|G|r'>$, and use (20) to relate it to the measurable signal, but the same perturbative analysis applies to the Green's function $G(r,\hat{s}; r',\hat{s}')$.

In the coordinate representation, the first Born approximation (3) has the form $$G(r_s,r_d)=G_0(r_s,r_d)-<r_s|G_0VG_0|r_d>, \quad (23)$$

where $$<r_s|G_0VG_0|r_d>=\int G_0(r_s,r)V(r)G_0(r,r_d)d^3r. \quad (24)$$

Consequently, the data function defined by $$\phi(r_s, r_d) = \left(1 + \frac{l^*}{l}\right)^2 [G_0(r_s, r_d) - G(r_s, r_d)] \quad (25)$$

satisfies the linear integral equation $$\phi(r_s, r_d) = \left(1 + \frac{l^*}{l}\right)^2 \int G_0(r_s, r) V(r) G_0(r, r_d) d^3 r. \quad (26)$$

Here the factor $(1*/l)^2$ is retained for the reasons discussed in section 1 and the constant $c/4\pi$ omitted. Eq. (25) is used to calculate $\phi$ from G, while in equation (26) $\phi$ must be regarded as given and V as unknown. Note that (26) has the same form as (4).

In addition to the first Born approximation, there are other ways to obtain an equation of the type (26) in which the measurable data function is linear in V. The first Rytov approximation is frequently used, in which G is given by $$G(r_s, r_d) = G_0(r_s, r_d) \exp\left[-\frac{\langle r_s | G_0 V G_0 | r_d \rangle}{G_0(r_s, r_d)}\right]. \quad (27)$$

Eq. (27) can be brought to the form (26) by using the following definition for the data function:

$$\phi(r_s, r_d) = -\left(1 + \frac{l^*}{l}\right)^2 G_0(r_s, r_d) \ln\left[\frac{G(r_s, r_d)}{G_0(r_s, r_d)}\right]. \quad (28)$$

Here the term under the logarithm can be identified as the transmission coefficient.

Another possible approach is analogous to the mean-field approximation. The mean field approximation is obtained from the Dyson equation (2) by fixing the position of source and making the ansatz $G(r,r_d) = a(r_s,r_d) G_0(r,r_d)$. Substituting this expression into (2) we can formally solve for $a(r_s, r_d)$ and obtain:

$$G(r_s, r_d) = G_0(r_s, r_d) \left[1 + \frac{\langle r_s | G_0 V G_0 | r_d \rangle}{G_0(r_s, r_d)}\right]^{-1}. \quad (29)$$

Eq. (29) can be brought to the form (26) by defining the data function according to $$\phi(r_s, r_d) = \left(1 + \frac{l^*}{l}\right)^2 \frac{G_0(r_s, r_d)}{G(r_s, r_d)} [G_0(r_s, r_d) - G(r_s, r_d)]. \quad (30)$$

Application of different formulations of perturbation theory, as discussed above, to calculating the Green's function for the diffusion equation can be qualitatively illustrated. We have considered a model situation of a spherical inhomogeneity of radius R characterized by the diffuse wave number $k_2 = \sqrt{\alpha_2/D_2}$ embedded in an infinite medium with the diffuse wave number $k_1 = \sqrt{\alpha_1/D_1}$, where $\alpha_{1,2}$ and $D_{1,2}$ are the absorption and diffusion coefficients in the background medium and inside the sphere, respectively. The Green's function can be found in this case analytically from the scalar wave Mie solution for imaginary wave numbers. Placing the origin at the center of the sphere, we obtain $G(r_s,r_d) = G_0(r_s,r_d) - (2k_1/\pi D_1) S(r_s,r_d)$. Here the dimensionless relative shadow $S(r_s,r_d)$ is given by $$S(r_s, r_d) = \sum_{l=0}^{\infty} \frac{(2l+1)a_l}{4\pi} P_l(\hat{r}_s \cdot \hat{r}_d), \quad (31)$$

with $a_l$ being the Mie coefficients $$a_l = \frac{m I_l(k_1 R) I'_l(k_2 R) - I_l(k_2 R) I'_l(k_1 R)}{m I'_l(k_2 R) K_l(k_1 R) - I_l(k_2 R) K'_l(k_1 R)}, \quad (32)$$

where $m = k_2/k_1$, $P_l(x)$ are the Legendre polynomials, $I_l(x)$, $K_l(x)$ are the modified spherical Bessel and Hankel functions of the first kind, prime denotes differentiation of functions with respect to the argument in the parenthesis and the the points $r_s, r_d$ are outside of the sphere ($r_s, r_d > R$).

Consider plotting S as a function of the ratio $k_2/k_1$ for different source detector pairs. The locations of the sources and detectors are specified in a Cartesian reference frame (x, y, z) with the origin in the center of the sphere by $r_s = (-L/2, 0, z)$ and $r_d = (L/2, 0, z)$ where z can take different values. The sphere radius was chosen to be R=0.4L. It can be seen that, in most cases, the mean-field approximation is superior to the first Rytov, and the first Rytov is, in turn, superior to Born. It should be kept in mind that to obtain the contrast of the absorption or diffusion coefficient, the value of $k_2/k_1$ must be squared. Thus a ten-fold increase of the absorption coefficient inside the sphere corresponds to $k_2/k_1 \approx 3$.

3 Planar Geometry 3.1 Integral Equations in the Planar Geometry

Figure 2:
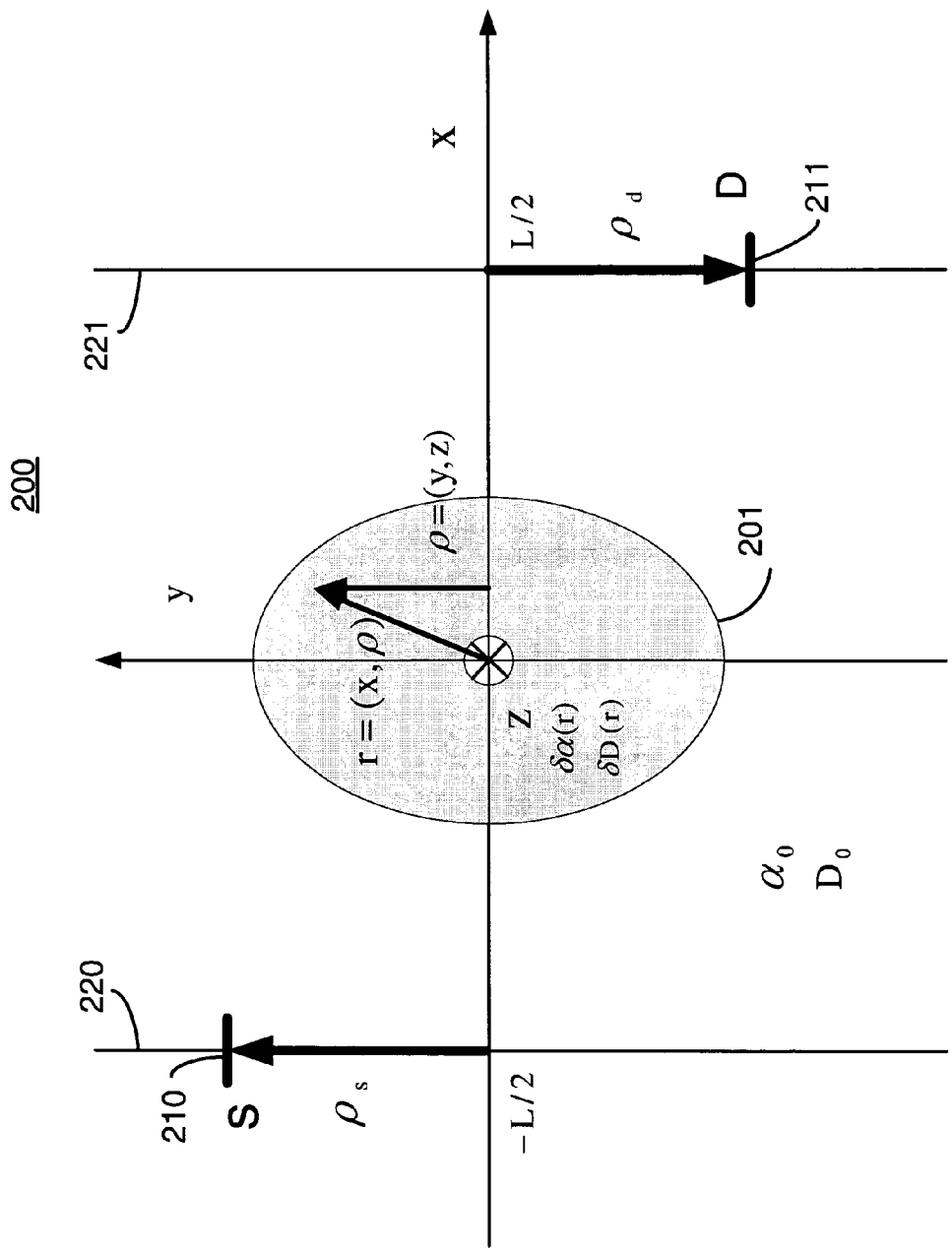
FIG. 2 depicts a sample positioned between the light source and detector arrangements for the slab geometry.

The planar geometry is illustrated in FIG. 2 by slab geometry 200. The medium 201 to be imaged is located between two parallel measurement planes 210 and 211 separated by the distance L. Intensity measurements are taken with multiple source-detector pairs denoted "S" (220) and "D" (221). We denote the coordinates of the sources and detectors as $r_s = (x_s, \rho_s)$ and $r_d = (x_d, \rho_d)$, respectively. Here $\rho_{s,d} = (y_{s,d}, z_{s,d})$ are two-dimensional vectors parallel to the measurement planes. Without loss of generality, we assume that "transmission" measurements are performed with $x_s = -L/2$ and $x_d = L/2$, while "reflection" measurements with $x_s = x_d = -L/2$. A point inside the medium will be denoted $r = (x, \rho)$, where $\rho = (y, z)$ is a two dimensional vector parallel to the measurement planes. Further, it is assumed that the source and detector optical fibers are oriented perpendicular to the measurement surfaces and that their diameters are small compared to all other physically relevant scales. Therefore, the measured specific intensity is given, up to a multiplicative constant, by the Green's function $G(x_s, \rho_s, \hat{s}_d = \hat{x}; x_d, \rho_d, \hat{s}_d = \pm\hat{x})$, where plus corresponds to the transmission geometry and minus to the reflection geometry.

In each experiment, the parameters $x_s, x_d, \hat{s}_s$ and $\hat{s}_d$ are fixed. Therefore, we focus on the dependence of the data on $\rho_s, \rho_d$ and $\omega$. Then with use of one of the linearization methods discussed in section 2, we obtain the integral equation $$\phi(\omega, \rho_s, \rho_d) = \int \Gamma(\omega, \rho_s, \rho_d; r) \eta(r) d^3 r. \quad (33)$$

A few remarks concerning the above equation are necessary. First, the function $\phi$ is the experimentally measurable data function. To determine $\phi$, it is necessary to know the full Green's function $G(x_s, \rho_s, \hat{s}_s; x_d, \rho_d, \hat{s}_d)$ as well as the unperturbed Green's function $G_0 G(x_s, \rho_s, \hat{s}_s; x_d, \rho_d, \hat{s}_d)$. The latter can be calculated analytically, or, in some cases, measured experimentally using a homogeneous medium. The exact expression for $\phi$ in terms of G and $G_0$ depends on the linearization method used. Second, $\eta(r)$ is a vector representing the deviations of optical coefficients from their background values. Thus, $$\eta(r) = \begin{pmatrix} \delta\mu_a(r) \\ \delta\mu_s(r) \end{pmatrix} \text{ (for RTE)}; \quad \eta(r) = \begin{pmatrix} \delta a(r) \\ \delta D(r) \end{pmatrix} \text{ (for DE)}. \tag{34}$$

Correspondingly, $\Gamma(\omega, \rho_s, \rho_d; r)$ is a vector of functions that multiply the respective coefficients. The specific form of F can be found if $G_0$ is known; we will give examples of such calculations in section 4. Here we define $$\Gamma(\omega, \rho_s, \rho_d; r) = \begin{cases} (\Gamma_{\mu_a}(\omega, \rho_s, \rho_d; r), \Gamma_{\mu_s}(\omega, \rho_s, \rho_d; r)) & \text{(for RTE)}, \\ (\Gamma_a(\omega, \rho_s, \rho_d; r), \Gamma_D(\omega, \rho_s, \rho_d; r)) & \text{(for DE)}. \end{cases} \tag{35}$$

A fundamental property of the kernel $\Gamma$ is its translational invariance. Mathematically, this means that $\Gamma(\omega, \rho_s, \rho_d; r)$ depends only on $\rho_s - \rho$ and $\rho_d - \rho$ rather than on the three parameters $\rho_s, \rho_d$ and $\rho$ separately, so that the simultaneous transformation $\rho_{s,d} \to \rho_{s,d} + a, \rho \to \rho + a$ will leave the kernel invariant. Therefore, $\Gamma(\omega, \rho_s, \rho_d; r)$ can be written as the Fourier integral $$\Gamma(\omega, \rho_s, \rho_d; r) = \int \frac{d^2 q_s d^2 q_d}{(2\pi)^4} \kappa(\omega, q_s, q_d; x) \exp[iq_s \cdot (\rho - \rho_s) + iq_d \cdot (\rho_d - \rho)], \tag{36}$$

where $\kappa$ is the vector: $\kappa = (\kappa_{\mu_a}, \kappa_{\mu_s})$ for the RTE and $\kappa = (\kappa_{60}, \kappa_D)$ for the DE. Note that the isotropy of space requires that $\kappa$ depends only on the absolute values of the two-dimensional vectors $q_{s,d}$.

By introducing the new variables $\Delta\rho$, q and p according to $\rho_d = \rho_s + \Delta\rho$ and $q_s = q + p$, $q_d = p$, we find that $$\Gamma(\omega, \Delta\rho, \rho_s; r) = \int \frac{d^2 q}{(2\pi)^2} K(\omega, \Delta\rho, q; x) \exp[iq \cdot (\rho - \rho_s)], \tag{37}$$

where $$K(\omega, \Delta\rho, q; x) = \int \frac{d^2 p}{(2\pi)^2} \kappa(\omega, q + p, p; x) \exp(ip \cdot \Delta\rho) \tag{38}$$

and the integral equation (33) takes the form $$\phi(\omega, \Delta\rho, \rho_s) = \int \Gamma(\omega, \Delta\rho, \rho_s; r) \eta(r) d^3 r. \tag{39}$$

Note that in equations (37)–(39) the list of formal arguments of $\Gamma$ and $\phi$ has been changed. Thus, for example, the data function $\phi(\omega, \rho_s, \rho_s + \Delta\rho)$ is replaced by $\phi(\omega, \Delta\rho, \rho_s)$.

We now discuss the sampling of data. First, we assume that the sources are located on a square lattice with lattice spacing h (recall FIG. 1B) so that $\rho_s = h(\hat{y} n_y + \hat{z} n_z)$ where $n_y$ and $n_z$ are integers. Second, the vectors $\Delta\rho$, which specify the source-detector transverse separation, are assumed to belong to the set $\Sigma$, $\Delta\rho \in \Sigma$. One can consider the situation when $\Sigma$ is a square lattice, commensurate with the lattice of sources, with a spacing h' as a special case. Another case arises when the detectors continuously occupy the whole plane. Finally, the modulation frequencies belong to a finite set $\{\omega_j; j=1, 2, \ldots, N_\omega\}$.

We also consider an approach in which $N_d$ different linear combinations (with complex coefficients $c_{ij}$) of detector outputs are directly measured, allowing for the possibility of a phased-array measurement scheme. In this case, equations (37) and (38) must be modified according to $$\Gamma(\omega, i, \rho_s; r) = \int \frac{d^2 q}{(2\pi)^2} K(\omega, i, q; x) \exp[iq \cdot (\rho - \rho_s)], \tag{40}$$

$$i = 1, \ldots, N_d$$

$$K(\omega, i, q; x) = \int \frac{d^2 p}{(2\pi)^2} \kappa(\omega, q + p, p; x) \sum_{\Delta\rho_j \in \Sigma} c_{ij} \exp(ip \cdot \Delta\rho_j), \tag{41}$$

$$i = 1, \ldots, N_d$$

and the integral equation for phased-array measurements becomes $$\phi(\omega, i, \rho_s) = \int \Gamma(\omega, i, \rho_s; r) \eta(r) d^3 r, \quad i = 1, \ldots, N_d, \tag{42}$$

where $$\phi(\omega, i, \rho_s) = \sum_{\Delta\rho_j \in \Sigma} c_{ij} \phi(\omega, \Delta\rho_j, \rho_s), \quad i = 1, \ldots, N_d. \tag{43}$$

Note that the matrix $c_{ij}$ does not need to be square; in the case of a continuous set $\Sigma$, the summation must be replaced by integration and $c_{ij}$ by a vector of functions $c_i(\beta\rho)$.

3.2 Inversion Formulas

It is convenient to define a new three-dimensional variable $\mu = (\omega, \Delta\rho)$ or $\mu = (\omega, i)$, with S the set of such $\mu$, and rewrite (43) as $$\phi(\mu, \rho_s) = \int \Gamma(\mu, \rho_s; r) \eta(r) d^3 r. \tag{44}$$

The integral operator $\Gamma$ defines a map between two different Hilbert spaces $H_1$ and $H_2$. Eq. (44) can be written in Dirac notation as $$|\phi\rangle = \Gamma|\eta\rangle. \tag{45}$$

The pseudoinverse solution to (45) is given by $$|\eta\rangle = \Gamma^+|\phi\rangle. \tag{46}$$

Here the pseudoinverse operator $\Gamma^+$ is given by $$\Gamma^+ = (\Gamma^*\Gamma)^{-1}\Gamma^* = \Gamma^*(\Gamma\Gamma^*)^{-1}, \tag{47}$$

where "*" denotes Hermitian conjugation and the expressions $(\Gamma^*\Gamma)^{-1}$ and $(\Gamma\Gamma^*)^{-1}$ must be appropriately regularized. The regularized singular-value decomposition (SVD) of the pseudoinverse operator is given by $$\Gamma^+ = \sum \Theta(\sigma_n, \epsilon) \frac{|g_n\rangle\langle f_n|}{\sigma_n}, \qquad (48)$$

where $\Theta(x, \epsilon)$ is an appropriate regularizer, $\epsilon$ is a small regularization parameter, and the singular functions $|f_n\rangle$ and $|g_n\rangle$ are eigenfunctions with eigenvalues $\sigma_n^2$ of the operators $\Gamma\Gamma^*$ and $\Gamma^*\Gamma$, respectively:

$$\Gamma\Gamma^*|f_n\rangle = \sigma_n^2|f_n\rangle, \Gamma^*\Gamma|g_n\rangle = \sigma_n^2|g_n\rangle. \qquad (49)$$

In addition, the following relations hold:

$$\Gamma^*|f_n\rangle = \sigma_n|g_n\rangle, \Gamma|g_n\rangle = \sigma|f_n\rangle. \qquad (50)$$

To obtain the SVD for the pseudoinverse operator, we first consider the eigenfunctions and eigenvalues of the operator $\Gamma\Gamma^*$. Its matrix elements in the basis $|\mu\rho_s\rangle$ are given by $$\langle \mu\rho_s|\Gamma\Gamma^*|\mu'\rho_s'\rangle = \int \frac{d^2q}{(2\pi)^2}\langle \mu|M_1(q)|\mu'\rangle\exp[-iq\cdot(\rho_s - \rho_s')]. \qquad (51)$$

where $$\langle \mu|M_1(q)|\mu'\rangle = \int_{-L/2}^{L/2} K(\mu, q; x)K^*(\mu', q; x)dx. \qquad (52)$$

From (51), it can be seen that the effective dimensionality of the eigenproblem can be reduced. That is, the $\rho_s$-dependent part of the eigenfunctions can be found analytically. Indeed, the ansatz $$\langle \mu\rho_s|f_{vu}\rangle = \frac{h}{2\pi}\exp(-iu\cdot\rho_s)\langle \mu|C_v(u)\rangle, \qquad (53)$$

where v and u are the indexes that label the eigenfunctions with $\mu$, $v \in S$, and u is a two-dimensional vector in the first Brillouin zone (FBZ) of the lattice on which the sources are placed, $-\pi/h \leq u_y$, $u_z \leq \pi/h$. It can be verified that $|f_{vu}\rangle$ are eigenfunctions of $\Gamma\Gamma^*$ if $|C_v(u)\rangle$ are eigenvectors of the matrix M(u) defined by $$M(u) = \sum_v M_1(u + v), \qquad (54)$$

where the v's are reciprocal lattice vectors, $v=(2\pi/h)(n_y\hat{y}+n_z\hat{z})$. We denote the eigenvalues of the nonnegative definite matrix M(u) by $M_v^2(u)$ and the singular values of the problem (the eigenvalues of $\Gamma\Gamma^*$) by $\sigma_{vu}^2$. Then the following relations hold:

$$M(u)|C_v(u)\rangle = M_v^2(u)|C_v(u)\rangle, \qquad (55)$$

$$\Gamma\Gamma^*|f_{vu}\rangle = \sigma_{vu}^2|f_{vu}\rangle, \qquad (56)$$

$$\sigma_{vu} = h^{-1}M_v(u). \qquad (57)$$

Note that the singular functions $|f_{vu}\rangle$ (53) are normalized according to $\langle f_{vu}|f_{v'u'}\rangle = \delta_{vv'}\delta(u-u')$.

The second set of singular functions, $|g_{vu}\rangle$, can be obtained from the relations (50):

$$\langle x\rho|g_{vu}\rangle = \frac{1}{2\pi h\sigma_{vu}}\exp(-iu\cdot\rho)\sum_\mu P^*(\mu, u; x, \rho)\langle \mu|C_v(u)\rangle, \qquad (58)$$

where $$P(\mu, u; x, \rho) = \sum_v K(\mu, u + v; x)\exp(iv\cdot\rho). \qquad (59)$$

To obtain an inversion formula, according to (46) and (48), we need to evaluate the scalar product $\langle f_{vu}|\phi\rangle$. It can be shown by direct calculation that $$\langle f_{vu}|\phi\rangle = \frac{h}{2\pi}\sum_\mu \langle C_v(u)|\mu\rangle\tilde{\phi}(\mu, u), \qquad (60)$$

where $\tilde{\phi}(\mu, u)$ is the lattice Fourier transform of $\phi(\mu,\rho_s)$ with respect to $\rho_s$:

$$\tilde{\phi}(\mu, u) = \sum_{\rho_s} \phi(\mu, \rho_s)\exp(iu\cdot\rho_s). \qquad (61)$$

Finally, we arrive at the following inversion formula:

$$\eta(r) = \sum_v \int_{FBZ} \frac{d^2u}{(2\pi)^2} \frac{1}{\sigma_{vu}^2}\Theta(\sigma_{vu}, \epsilon)\exp(-iu\cdot\rho) \times \qquad (62)$$
$$\sum_{\mu,\mu'} P^*(\mu, u; r)\langle \mu|C_v(u)\rangle\langle C_v(u)|\mu'\rangle\tilde{\phi}(\mu', u).$$

The above result can be simplified by noting the relation $$\sum_v \Theta(\sigma_{vu}, \epsilon)\frac{|C_v(u)\rangle\langle C_u(u)|}{M_{vu}^2} = M^{-1}(u). \qquad (63)$$

Using the above relation, the inversion formula (62) can be rewritten as $$\eta(r) = h^2\int_{FBZ}\frac{d^2u}{(2\pi)^2}\exp(-iu\cdot\rho)\sum_{\mu,\mu'} P^*(\mu, u; r)\langle \mu|M^{-1}(u)|\mu'\rangle\tilde{\phi}(\mu', u). \qquad (64)$$

The above formula is our main result pertaining to the planar geometry. In the reminder of this section, we discuss the important features of this inversion formula.

First, the pseudoinverse solution (64) was derived under the assumption that the sources occupy an infinite lattice. In practice, however, the sources must be restricted to a finite spatial window, that is, the data is spatially limited. In this case, the inversion formula (64) becomes approximate. However, a high accuracy can be achieved if the edges of the window are far enough from the inhomogeneities of the medium. This is because the Green's functions in an absorbing medium (for both RTE and DE) exponentially decay in space, and the data function can be effectively replaced by zero when the source location is far enough from the medium inhomogeneities.

Second, consider the computational complexity of the method. The variable u is continuous, but, in practice, must be discretized. The number of discrete vectors u should roughly correspond to the number of different sources used in the experiment. As discussed above, this is a finite number which we denote by $N_1$. We will refer to $N_1$ as to the number of external degrees of freedom. Next, let the variable $\mu$ run over $N_2$ discrete points. Here $N_2$ is the number of the "internal" degrees of freedom. A direct numerical SVD problem will require diagonalizing a matrix with the size $N_1 N_2$ which has computational complexity $O((N_1 N_2)^3)$ operations. However, the inversion formula (64) requires only $N_1$ diagonalizations of the matrix M(u) whose size is $N_2$ (hence the terms "external" and "internal" degrees of freedom). The computational complexity of this procedure is $O(N_1 N_2^3)$, which is $N_1^2$ times smaller than that for the purely numerical method. For large $N_1$, this is an enormous advantage. Note that one should add to the above estimate the number of operations necessary to Fourier-transform the data function and to sum over the variables $\mu$, $\mu'$ and u in equation (64). The computational cost of the first task scales as, $O(N_1 \log N_1)$ with the use of the fast Fourier transform and, if $\log N_1 \ll N_2^3$, can be neglected. The second task requires $O(N_1 N_2^2)$ operations, which is also negligibly small.

Third, it can be seen from the inversion formula (64) that the transverse resolution is limited by the lattice step h. Therefore, it is practical to evaluate the function $\eta(r) = \eta(x, \rho)$ only in such points $\rho$ which coincide with the lattice of sources. In this case, the factor $\exp(iv \cdot \rho)$ in the definition of $P(\mu, u; x, \rho)$ (59) becomes equal to unity and, consequently, P becomes independent of $\rho$ and can be written as $P(\mu, u; x)$. Then the double sum in (64) is a function of u and x only. This fact significantly improves the computational performance of the algorithm.

Fourth, we discuss the case of band-limited unknown functions. So far we placed no restrictions on $\eta(x, \rho)$ except for square integrability. In some cases it is known a-priori that $\eta(x, \rho)$ is smooth, i.e., does not change very fast in space. In particular, consider the case when it is known that the Fourier transform $\hat{\eta}(x, q)$ of the function a turns to zero if $|q_y| > \pi/h$ or $|q_z| > \pi/h$:

$$\hat{\eta}(x,q) = \int \eta(x,\rho) \exp(iq \cdot \rho) d^2\rho = 0, \text{ if } q \in \text{FBZ}. \tag{65}$$

Thus, functions which satisfy (65) are transversely band-limited to the FBZ of the lattice of sources. The operator $\Gamma$ that acts on the Hilbert space of such functions, $H_1^{bl}$, to the Hilbert space of the data, $H_2$, can be written as $$\Gamma(\mu, \rho_s; r) = \int_{FBZ} \frac{d^2 u}{(2\pi)^2} K(\mu, q; x) \exp[iu \cdot (\rho - \rho_s)]. \tag{66}$$

Note that integration in (66) over $d^2 u$ is limited to the FBZ, in contrast to the analogous equation (37) where integration over $d^2 q$ is carried out over the entire space. However, the two operators (66) and (37) are equivalent if they act on the space $H_1^{bl}$. This fact can be used to show that the SVD pseudo-inverse solution on the space of transversely band-limited functions $\eta$ has the form $$\eta(r) = h^2 \int_{FBZ} \frac{d^2 u}{(2\pi)^2} \exp(-iu \cdot \rho) \tag{67}$$
$$\sum_{\mu,\mu'} K^*(\mu, u; x) \langle \mu | M_1^{-1}(u) | \mu' \rangle \tilde{\phi}(\mu', u),$$

where $M_1$ is given by (52). Thus, summation over the reciprocal lattice vectors that is required for calculation of P and M in the inversion formula (64) is completely avoided if it is known a priori that $\eta$ is transversely band-limited.

Finally, we consider the mathematical limit $h \to 0$, which corresponds to measuring the data continuously. In this case all the reciprocal lattice vectors become infinite, except for v=0. Since the functions $K(\mu, q; x)$ decay exponentially with $|q|$, we have in this limit $M(u) = M_1(u)$ and $P(\mu, u; x, p) = K(\mu, u; x)$. We also use the relation $\lim_{h \to 0} (h^2 \tilde{\phi}) = \phi$, where $\phi$ is the continuous Fourier transform of the data function defined by $$\phi(\mu, u) = \int d^2 \rho_s \phi(\mu, \rho_s) \exp(iu \cdot \rho_s), \tag{68}$$

to show that, in the limit $h \to 0$, the inversion formula (64) becomes $$\eta(r) = \int \frac{d^2 q}{(2\pi)^2} \exp(-iq \cdot \rho) \tag{69}$$
$$\sum_{\mu,\mu'} K^*(\mu, q; x) \langle \mu | M_1^{-1}(q) | \mu' \rangle \hat{\phi}(\mu', q).$$

3.3 Special Cases 3.3.1 Fourier Tomography

In this section we consider the case when both sources and detectors are located on square lattices. We assume that the two lattices are commensurate and the lattice of detectors is a subset of the lattice of sources. More specifically, let $\rho_s = h_s(\hat{y} n_{sy} + \hat{z} n_{sz})$ and $\rho_d = h_d(\hat{y} n_{dy} + \hat{z} n_{dz})$ where $n_{sy}$, $n_{sz}$, $n_{dy}$, $n_{dz}$ and $h_d/h_s$ are integers ($h_d \geq h_s$).

First, consider the expression (38) for $K(\omega, \Delta\rho, q; x)$. For commensurate lattices and $h_d \geq h_s$, it can be seen that $\Delta\rho$ is on the same lattice as $\rho_d$. Therefore, (38) can be rewritten as $$K(\omega, \Delta\rho, q; x) = \int_{FBZ(h_d)} \frac{d^2 w}{(2\pi)^2} \sum_{v_d} \kappa(\omega, q + w + v_d, w + v_d; x) \tag{70}$$
$$\exp(iw \cdot \Delta\rho).$$

Here integration is carried out over the first Brillouin zone of the lattice with the step $h_d$ (FBZ($h_d$)) and $v_d = (2\pi/h_d)(\hat{y} n_y + \hat{z} n_z)$ is a reciprocal vector of the same lattice.

Substituting (70) into (52) and (54), we obtain the following expression for the elements of matrix M(u):

$$\langle \mu | M(u) | \mu' \rangle = \int_{FBZ(h_d)} \frac{d^2 w \, d^2 w'}{(2\pi)^4} \langle \omega w | \tilde{M}(u) | \omega' w' \rangle \tag{71}$$
$$\exp[i(w \cdot \Delta\rho - w' \cdot \Delta\rho')],$$

where

-continued $$\langle \omega w | \tilde{M}(u) | \omega' w' \rangle = \sum_{v_s} \sum_{v_d, v_d'} \langle \omega, w + v_d | \tilde{M}_1(u + v_s) | \omega', w' + v_d' \rangle \quad (72)$$

and $$\langle \omega p | \tilde{M}_1(q) | \omega' p' \rangle = \int_{-L/2}^{L/2} \kappa(\omega, q + p, p; x) \quad (73)$$

$$\kappa^*(\omega', q + p', p'; x) dx.$$

Here $v_s$ is a reciprocal vector for the lattice with the step $h_s$, u is in the FBZ of the same lattice and $>\omega w|\tilde{M}(u)|\omega' w'>$ can be viewed as a Fourier transform of $<\omega\Delta\rho|M(u)|w'\Delta\rho'>$ with respect to variables $\Delta\rho$ and $\Delta\rho'$.

It can be easily verified that the inverse of the matrix M(u) is given in terms of the inverse of $\tilde{M}(u)$ by the following formula:

$$\langle \mu | M^{-1}(u) | \mu' \rangle = \quad (74)$$

$$h_d^4 \int_{FBZ(h_d)} d^2\omega d^2\omega' \langle \omega w | \tilde{M}^{-1}(u) | \omega' w' \rangle \times \exp[i(w \cdot \Delta\rho - w' \cdot \Delta\rho')].$$

At the next step we substitute (74) into the inversion formula (64) and obtain the following result:

$$\eta(r) = (h_s h_d)^2 \int_{FBZ(h_s)} \frac{d^2 u}{(2\pi)^2} \exp(-iu \cdot \rho) \times \quad (75)$$

$$\sum_{\omega,\omega'} \int_{FBZ(h_d)} d^2 w \int_{FBZ(h_d)} d^2 w' \tilde{P}^*(\omega, w, u; r) \times$$

$$\langle \omega w | \tilde{M}^{-1}(u) | \omega' w' \rangle \tilde{\phi}(\omega', u + w', -w'),$$

where $$\tilde{P}(\omega, w, u; r) = \sum_{v_s, v_d} \kappa(\omega, u + v_s + w + v_d, w + v_d; x) \exp(iv_s \cdot \rho) \quad (76)$$

and $$\tilde{\phi}(\omega, q_s, q_d) = \sum_{\rho_s, \rho_d} \phi(\omega, \rho_s, \rho_d) \exp[i(q_s \cdot \rho_s + q_d \cdot \rho_d)]. \quad (77)$$

Note that here we use the original notation $\phi=\phi(\omega,\rho_s,\rho_d)$ where $\rho_s$ and $\rho_d$ are the coordinates of the source and detector, respectively.

An important feature of the obtained inversion formula is that it avoids numerical evaluation of the two-dimensional integral (38). Numerical integration according to (38) must be performed for every value of $\Delta\rho$, q and x used in the inversion formulas, which can easily become a formidable computational problem. However, the functions $\tilde{P}(\omega, w, u; r)$ and $\tilde{M}(u)$ appearing in the inversion formula (75) are expressed directly in terms of the functions $\kappa$. The price of this simplification is that the operator $\tilde{M}$ is continuous (unlike the discrete matrix M) and, therefore, difficult to invert. This problem is, however, easily avoided by replacing the integral over $d^2\omega d^2\omega'$ by a double sum over a finite set of discrete vectors $w_l$, $l=1, \ldots, N_\omega$:

$$\eta(r) = (h_s h_d)^2 \int_{FBZ(h_s)} \frac{d^2 u}{(2\pi)^2} \exp(-iu \cdot \rho) \sum_{\omega,\omega'} \sum_{w,w'} \tilde{P}^*(\omega, w, u; r) \times \quad (78)$$

$$\langle \omega w | \tilde{M}^{-1}(u) | \omega' w' \rangle \tilde{\phi}(\omega', u + w', -w'),$$

The expression (78) is no longer an SVD pseudo-inverse solution obtained on all the available data $\phi(\omega,\rho_s,\rho_d)$. Instead, it can be shown that (78) gives the pseudo-inverse solution on the double Fourier-transformed data $\tilde{\phi}(\omega, u+w, -w)$ where u continuously covers FBZ($h_s$) while w is discrete and in FBZ($h_d$).

The shortcoming of the double Fourier method is that in order to obtain $\tilde{\phi}(\omega, u+w, -w)$, the data function $\phi(\omega,\rho_s,\rho_d)$ must be experimentally measured for all possible points $\rho_s,\rho_d$, even if the number of discrete vectors w is small.

In general, the number of modulation frequencies used in the double Fourier method is arbitrary. However, two modulation frequencies (one of which could be zero) is always enough to simultaneously reconstruct both absorbing and scattering inhomogeneities. If one can assume that only absorbing inhomogeneities are present in the medium, single modulation frequency is sufficient, which would allow one to use the continuous-wave imaging.

Finally, it can be seen from the inversion formulas (75), (78) that the transverse resolution in the reconstructed images is determined by the step of the finer lattice ($h_s$). The discrete vectors w can be referred to as the "internal" degrees of freedom, similar to $\Delta\rho$. The number and choice of w's used in the reconstruction algorithm will influence the depth resolution.

In the limit $h_s$, $h_d \to 0$, inversion formula (78) takes the form $$\eta(r) = \int \frac{d^2 q}{(2\pi)^2} \exp(-iq \cdot \rho) \sum_{\omega,\omega'} \sum_{p,p'} \kappa^*(\omega, q + p, p; x) \quad (79)$$

$$\langle \omega p | \tilde{M}_1^{-1}(q) | \omega' p' \rangle \times \hat{\phi}(\omega', q + p', -p'),$$

where $\hat{\phi}(\omega, q_s, q_d)$ is the continuous Fourier transform of $\phi(\omega,\rho_s,\rho_d)$ with respect to $\rho_s$ and $\rho_d$.

13.3.2 Real-Space Tomography

This imaging modality is based on direct application of the inversion formula (64) where the set $\Sigma$ is assumed to contain enough points to make the inverse problem sufficiently determined. As in the case of double Fourier imaging, one or two distinct modulation frequencies can be employed. The main advantage of this method is that is uses real-space measurements as the input data and thus utilizes all experimental measurements in the most efficient way. However, numerical evaluation of functions K($\omega$, $\Delta\rho$, q; x) according to the definition (38) is complicated, especially for large values of |$\Delta\rho$| when the integral is strongly oscillatory, and can lead to loss of precision.

3.3.3 Coaxial and Paraxial Tomography

The coaxial and paraxial measurement schemes are the variations of the real-space method with the distinction that the number of discrete vectors $\Delta\rho$ which are used in the experiment is small and all the source-detector transverse displacements satisfy |$\Delta\rho$|<<L. This inequality makes the numerical evaluation of the oscillatory integral (38) much easier. The additional degrees of freedom which are necessary for making the inverse problem well-defined are obtained by considering many different modulation frequencies. The coaxial and paraxial tomography can be used only in the "transmission" geometry, when sources and detectors are placed on different planes.

In the purely coaxial measurement geometry, only one value of $\Delta\rho$ is used, namely $\Delta\rho=0$. Thus, the source and detector are always on axis. If only absorbing inhomogeneities are present, it can be seen by counting the degrees of freedom (two for source location plus one for modulation frequency) that the inverse problem is just enough determined in this case. However, there is a symmetry in the integral equations which would result in appearance of certain artifacts in the reconstructed images. Namely, the function $K(\omega, 0, q; x)$ defined by (38) is symmetrical in x: $K(\omega, 0, q; x)=K(\omega, 0, q; -x)$. Therefore, and inhomogeneity $\eta(x,\rho)$ and its mirror reflection with respect to the plane $x=0$, $\eta'(x,\rho)=\eta(-x,\rho)$ would produce the same data function $\phi$. In this situation, the SVD pseudo-inverse solution would approach (assuming infinite numerical precision of computations and an infinite set of modulation frequencies) the function $\eta''=(\eta+\eta')/2$. Thus, if a medium has an inhomogeneity at the point $(x_0, y_0, z_0)$, the pseudo-inverse solution would show an inhomogeneity at this point and at its mirror reflection, $(-x_0, y_0, z_0)$. The problem is solved by using paraxial data (recall FIG. 1E) (with $0<\Delta\rho<<L$), including summation according to (40). Small source-detector separations of the order of one lattice step h are sufficient to break the symmetry and eliminate the false images. If both absorbing and diffusing inhomogeneities are present, at least two detectors per source are required to make the problem well determined.

The paraxial methods are attractive due to their experimental simplicity. Indeed, instead of independently scanning the sources and detectors over the measurement planes, as is required in both the double Fourier and the real-space methods, in the paraxial measurement scheme one only needs to scan a fixed source-detector "arragement" as is illustrated in FIG. 1E.

3.3.4 Plane Wave Detection/Illumination Scheme

An especially simple reconstruction algorithm is obtained in the case when for each location of the source the output of all possible detectors is added up. Experimentally, this can be achieved with the use of a lens to either collect the outgoing radiation or to illuminate the medium. Both approaches are mathematically identical due to the source-detector reciprocity. Obviously, this method can be applied only in the transmission geometry, similar to the paraxial and coaxial methods. The plane wave illumination scheme was first proposed for time-resolved diffuse tomography; here we show that this method is a particular case of the phased-array measurement scheme which is discussed in section 3.1.

We will consider a point source which is scanned over the measurement plane $x=-L/2$ and an integrated detector at $x=L/2$ which measures the quantity $\int d^2\rho_d \phi(\omega, \rho_s, \rho_d)$. Accordingly, summation in equation (40) over discrete values of $\Delta\rho_j$ must be replaced by integration over $d^2\Delta\rho$ and the coefficients $c_{ij}$ replaced by unity. This results in a simple expression for $K(\omega, q; x)$ which is now independent of variable i:

$$K(\omega, q; x) = \kappa(\omega, q, 0; x). \quad (80)$$

Similarly, the kernel $\Gamma$ defined by (40) becomes independent of i: $\Gamma=\Gamma(\omega, \rho_s; r)$.

It can be seen that the numerical evaluation of functions K which is required in both real-space and paraxial modalities is altogether avoided. Reconstructed images are obtained by a straightforward application of formula (64) where $\mu=\omega$ and, similar to coaxial and paraxial imaging schemes, multiple modulation frequencies must be employed.

3.4 Cylindrical Geometry

Figure 3:
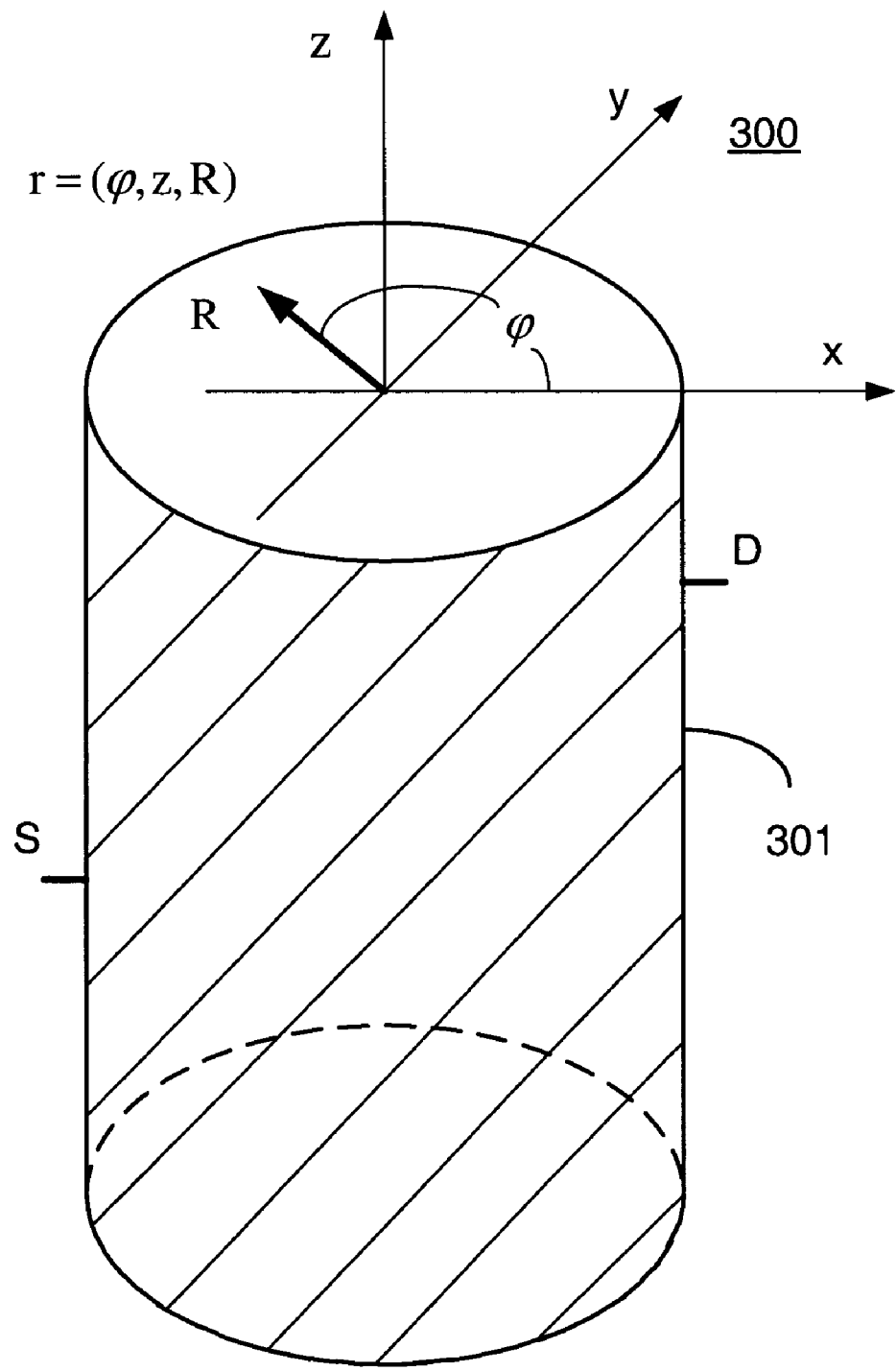
FIG. 3 depicts a sample positioned between the light source and detector arrangements for the cylindrical geometry.

The cylindrical geometry is illustrated by arrangement 300 of FIG. 3. The data function is measured on an infinite surface $R=L/2$ (surface 301), where where we have used cylindrical coordinates $r=(\phi,z,R)$. The data function can be written as $\phi=\phi(\omega,\phi_s,z_s,\phi_d, z_d)$, where $(\phi_s,z_s)$ characterize the location of the source and $(\phi_d,z_d)$ of the detector. It must satisfy the linear equation $$\phi(\omega, \varphi_s, z_s, \varphi_d, z_d) = \int_0^{2\pi} d\varphi \int_{-\infty}^{\infty} dz \int_0^{L/2} R dR \quad (81)$$
$$\Gamma(\omega, \varphi_s, z_s, \varphi_d, z_d; \varphi, z, R)\eta(\varphi, z, R).$$

The invariance of the unperturbed medium with respect to translations along the z-axis and rotations around it requires that the kernel $\Gamma$ has a Fourier expansion $$\Gamma(\omega, \varphi_s, z_s, \varphi_d, z_d; \varphi, z, R) = \sum_{m_s, m_d} \int \frac{dq_s dq_d}{(2\pi)^4} \quad (82)$$
$$\kappa(\omega, m_s, q_s, m_d, q_d; R) \times$$
$$\exp[iq_s(z-z_s) + iq_d(z_d-z) +$$
$$im_s(\varphi-\varphi_s) + im_d(\varphi_d-\varphi)].$$

Similar to the case of planar measurements, we introduce new variables $\Delta z, \Delta\phi, q, p, m$ and n according to $z_d=z_s+\Delta z$, $\phi_d=\phi_s+\Delta\phi$ and $q_s=q+p$, $q_d=p$, $m_s=m+n$, $m_d=n$. We also introduce the composite variable $\mu$, which in the case of the cylindrical geometry has the form $\mu=(\omega,\Delta\phi,\Delta z)$. Then the kernel $\Gamma$ acquires the form $$\Gamma(\mu, \varphi_s, z_s; \varphi, z, R) = \quad (83)$$
$$\sum_m \int \frac{dq}{(2\pi)^2} K(\mu, q, m; R) \exp[im(\varphi-\varphi_s) + iq(z-z_s)],$$

where $$K(\mu, q, m; R) = \quad (84)$$
$$\sum_n \int \frac{dp}{(2\pi)^2} \kappa(\omega, m+n, q+p, n, p; R) \exp[i(p\Delta z + n\Delta\varphi)].$$

Further derivations are very similar to those performed for the geometry in section 3.2. The only difference is that the variable y which in the case of an infinite medium varies from $-\infty$ to $\infty$ is replaced by $\phi$ which now varies from 0 to $2\pi$. To build an inversion formula, we assume that $z_s$ is on an infinite one-dimensional lattice with step h while $\phi_s$ takes the values $2\pi(j-1)/N_\phi$, $j=1, 2, \ldots, N_\phi$, and consider the eigenfunctions and eigenvalues of the operator $\Gamma\Gamma^*$. Omitting intermediate calculations, we adduce the final result (analog of equation 64 for the planar geometry):

$$\eta(r) = h \sum_{n=1}^{N_\varphi} \int_{-\pi/h}^{\pi/h} \frac{du}{(2\pi)^2} \exp(-i(uz + n\varphi) \times \sum_{\mu,\mu'} P^*(\mu, n, u; r) \langle \mu | M^{-1}(n, u) | \mu' \rangle \tilde{\phi}(\mu', n, u). \text{ Here}$$
(85)

$$P(\mu, n, u; r) = \sum_{k=-\infty}^{\infty} \sum_v K(\mu, u + v, n + N_\varphi k; R) \times \exp[i(vz + N_\varphi k\varphi)],$$
(86)

$$M(n, u) = \sum_{k=-\infty}^{\infty} \sum_v M_1(n + N_\varphi k, u + v),$$
(87)

$$\langle \mu | M_1(m, q) | \mu' \rangle = \int_0^{L/2} K(\mu, q, m; R) K^*(\mu', q, m; R) R \, dR,$$
(88)

$$\tilde{\phi}(\mu, n, u) = \sum_{\varphi_s, z_s} \phi(\mu, \varphi_s, z_s) \exp[i(n\varphi_s + uz_s)].$$
(89)

All the analysis which applies to the inversion formulas in the plane geometry is also applicable to equation (85). For example, the inverse matrix $M^{-1}$ (n, u) must be appropriately regularized. The inversion formula (85) corresponds to the real-space method in the plane geometry. However, other special cases can be also considered. If either $\Delta\phi$ or $\Delta z$, or both of them, are on a lattice (which would require that the detectors are placed on a lattice which is a subset of the lattice of the sources), the double Fourier method discussed in section 3.3.1 can be applied. Paraxial measurement scheme (section 3.3.3) corresponds to the case when only a few values of $\Delta\phi = \pi + \delta\phi$ and $\Delta z$ are used (where $\delta\phi << \pi$ and $\Delta z << L/2$) in conjunction with multiple modulation frequencies. Similar to the planar geometry, in the purely coaxial case a symmetry is present in equation (81) with respect to rotation of $\eta(r)$ by the angle $\pi$ around the z-axis. This symmetry would result in appearance of artifacts in the reconstructed images. The problem is solved by the use of off-axis data.

The only special case discussed in section 3.3 that can not be considered in the cylindrical geometry is the plane wave detection/illumination (section 3.3.4). The reason is that one can not integrate the detector output over all values of $\Delta\phi$ and $\Delta z$ since this will necessarily include the location of the source. In the planar geometry sources and detectors can be placed on different planes which do not intersect, which is not the case in the cylindrical geometry. While it is possible to achieve similar mathematical simplifications by integrating the source and detector outputs over angles while both source and detector have different z-coordinates, namely $z_s \neq z_d$ (physically, this corresponds to using ring rather than point-like sources and detectors), this will lead to a complete loss of angular resolution in the reconstructed images. Analogously, integration of the source and detector outputs along infinite lines parallel to the cylinder axis and characterized by different angles $\phi_s \neq \phi_d$ will result in a complete loss of z-resolution.

4 Examples of Calculating the Kernels

In this section we present an example of calculating the kernel $\Gamma$ of the integral equations (33) and (81) and the related functions $\kappa$ appearing in the Fourier expansions of $\Gamma$ (36) and (82). We consider the diffusion approximation in the planar and cylindrical geometries with boundary conditions given by (18). As discussed in section 2, regardless of the linearization method used, the linearized integral equation that couples the unknown operator V to the measurable data function is given by (26). Thus, to obtain expressions for $\kappa$, we must calculate the unperturbed Green's functions for the DE in appropriate coordinates.

4.1 Planar Geometry

In the planar geometry, the unperturbed Green's function can be written as $$G_0(r, r') = \int \frac{d^2 q}{(2\pi)^2} g(q; x, x') \exp[iq \cdot (\rho' - \rho)].$$
(90)

Substituting this expression into the integral equation (26), where the operator V is defined by (22), and comparing to the definition of functions $\kappa$ (36), we find that $\kappa = (\kappa_\alpha, \kappa_D)$ is expressed in terms of the functions g as $$\kappa_\alpha(\omega, q_s, q_d; x) = \left(1 + \frac{l^*}{l}\right)^2 g(q_s; x_s, x) g(q_d; x, x_d),$$
(91)

$$\kappa_D(\omega, q_s, q_d; x) = \left(1 + \frac{l^*}{l}\right)^2 [q_s \cdot q_d g(q_s; x_s, x) g(q_d; x, x_d) + \frac{\partial g(q_s; x_s, x)}{\partial x} \frac{\partial g(q_d; x, x_d)}{\partial x}].$$
(92)

Here an implicit dependence of the functions g on the modulation frequency $\omega$ is implied.

Thus, it is sufficient to find the functions g which satisfy the DE (21) and the boundary conditions (18). Substituting (90) into (21), we find that g(q; x, x') must satisfy the one-dimensional equation $$\left[\frac{\partial^2}{\partial x^2} - Q^2(q)\right] g(q; x, x') = -\frac{\delta(x - x')}{D_0},$$
(93)

where $$Q(q) = (q^2 + k^2)^{1/2}$$
(94)

and the diffuse wave number k is given by $k^2 = (\alpha_0 - i\omega)/D_0$.

As follows from (93), the function g is a linear combination of exponentials $\exp(\pm Qx)$ with coefficients depending on x'. It is continuous at x=x' but its first derivative experiences a discontinuity at this point:

$$g(q; x'+0, x') - g(q; x'-0x') = 0,$$
(95)

$$g'(q; x'+0, x') - g'(q; x'-0, x') = -1/D_0.$$
(96)

In addition, the boundary conditions (18) at $x \pm L/2$ read $$g(q; -L/2, x') - lg'(q; 0, x') = 0,$$
(97)

$$g(q; L/2, x') + lg'(q; L/2, x') = 0,$$
(98)

where the prime denotes differentiation with respect to x. The conditions (95–98) lead to the following expression for g:

$$g(q; x, x') = \frac{[1 + (Ql)^2]\cosh[Q(L - |x - x'|)] - [1 - (Ql)^2]}{2D_0 Q[\sinh(QL) + 2Ql\cosh(QL) + (Ql)^2\sinh(QL)] \times \cosh[Q(x + x')] + 2Ql\sinh[Q(L - |x - x'|)]}. \quad (99)$$

This expression can be simplified if we take into account that in the integral equation (26) one of the arguments of the Green's functions (r or r') must be on the boundary. Thus, it is enough to consider the above expression in the limit when either $x = \pm L/2$ or $x' = \pm L/2$. It can be seen that these two limits are given by the same expression, namely $$g(q; x, x')|_{x=\pm L/2} = g(q; x, x')|_{x'=\pm L/2} = \frac{l}{D_0} g_b(q; x, x'), \quad (100)$$

where $$g_b(q; x, x') = \frac{\sinh[Q(L - |x - x'|)] + Ql\cosh[Q(L - |x - x'|)]}{\sinh(QL) + 2Ql\cosh(QL) + (Ql)^2\sinh(QL)}. \quad (101)$$

Now the functions $\kappa$ can be expressed in terms of the functions $g_b$ as $$\kappa_\alpha(\omega, q_s, q_d; x) = \left(\frac{l + l^*}{D_0}\right)^2 g_b(q_s; x_s, x) g_b(q_d; x, x_d), \quad (102)$$

$$\kappa_D(\omega, q_s, q_d; x) = \left(\frac{l + l^*}{D_0}\right)^2 [q_s \cdot q_d g_b(q_s; x_s, x) g_b(q_d; x, x_d) + \frac{\partial g_b(q_s; x_s, x)}{\partial x} \frac{\partial g_b(q_d; x, x_d)}{\partial x}]. \quad (103)$$

The above expressions are well defined in the limits $l \to 0$ and $l \to \infty$. For example, for purely absorbing boundaries ($l = 0$) and in the transmission geometry ($x_s = -L/2$ and $x_d = L/2$), we obtain $$\kappa_\alpha(S, q_s, q_d; x) = \left(\frac{l^*}{D_0}\right)^2 \frac{\sinh[Q(q_s)(L/2 - x)]\sinh[Q(q_d)(L/2 + x)]}{\sinh[Q(q_s)L]\sinh[Q(q_d)L]}, \quad (104)$$

$$\kappa_D(S, q_s, q_d; x) = \quad (105)$$
$$\left(\frac{l^*}{D_0}\right)^2 \left[-\frac{Q(q_s)Q(q_d)\cosh[Q(q_s)(L/2 - x)]\cosh[Q(q_d)(L/2 + x)]}{\sinh[Q(q_s)L]\sinh[Q(q_d)L]} + \frac{q_s \cdot q_d \sinh[Q(q_s)(L/2 - x)]\sinh[Q(q_d)(L/2 + x)]}{\sinh[Q(q_s)L]\sinh[Q(q_d)L]}\right].$$

In the opposite limit of purely reflecting boundaries, we obtain $$\kappa_\alpha(\omega, q_s, q_d; x) = \frac{\cosh[Q(q_s)(L/2 - x)]\cosh[Q(q_d)(L/2 + x)]}{D_0^2 Q(q_s)Q(q_d)\sinh[Q(q_s)L]\sinh[Q(q_s)L]}, \quad (106)$$

$$\kappa_D(\omega, q_s, q_d; x) = \quad (107)$$
$$\frac{1}{D_0^2}\left[-\frac{\sinh[Q(q_s)(L/2 - x)]\sinh[Q(q_d)(L/2 + x)]}{\sinh[Q(q_s)L]\sinh[Q(q_d)L]} + \frac{q_s \cdot q_d \cosh[Q(q_s)(L/2 - x)]\cosh[Q(q_d)(L/2 + x)]}{Q(q_s)Q(q_d)\sinh[Q(q_s)L]\sinh[Q(q_d)L]}\right].$$

4.2 Cylindrical Geometry

In the cylindrical geometry we use the following expansion of the unperturbed Green's function $$G_0(r, r') = \sum_{m=-\infty}^{\infty} \int \frac{dq}{(2\pi)^2} \exp[im(\varphi - \varphi')]\exp[iq(z - z')]g(m, q; R, R'). \quad (108)$$

Similar to the planar geometry, we can express the functions $\kappa$ appearing in (82) in terms of the functions g defined above as $$\kappa_\alpha(\omega, m_s, q_s, m_d, q_d; R) = \quad (109)$$
$$\left(1 + \frac{l^*}{l}\right)^2 g(m_s, q_s; L/2, R)g(m_d, q_d; R, L/2),$$

$$\kappa_D(\omega, m_s, q_s, m_d, q_d; R) = \quad (110)$$
$$\left(1 + \frac{l^*}{l}\right)^2 \left[\frac{\partial g(m_s, q_s; L/2, R)}{\partial R} \frac{\partial g(m_d, q_d; R, L/2)}{\partial R} + \left(q_s q_d + \frac{m_s m_d}{R^2}\right) g(m_s, q_s; L/2, R)g(m_d, q_d; R, L/2)\right].$$

Here we took account of the fact that for both sources and detectors, $R_s = R_d = L/2$.

Upon substitution of (108) into the DE (21), we find that $g(m, q; R, R')$ must satisfy the one-dimensional equation $$\left[\frac{1}{R}\frac{\partial}{\partial R}R\frac{\partial}{\partial R} - \frac{m^2}{R^2} - Q^2(q)\right]g(m, q; R, R') = -\frac{\delta(R - R')}{D_0 R}. \quad (111)$$

The solution to (108) is given by a combination of modified Bessel and Hankel functions of the first kind, $I_m(QR)$ and $K_m(QR)$, and is subject to the following conditions:

$$g(m, q; 0, R') < \infty, \quad (112)$$

$$g(m, q; R'+0, R') - g(m, q; R'-0, R') = 0, \quad (113)$$

$$g'(m, q; R'+0, R') - g'(m, q; R'-0, R') = -1/D_0 R', \quad (114)$$

$$g(m, q; L/2, R') + lg'(m, q; L/2, R') = 0. \quad (115)$$

The function that satisfies the above conditions is $$g(m, q; R, R') = \frac{1}{D_0}\left[K_m(QR_>)I_m(QR_<) - \quad (116)\right.$$

-continued
$$\frac{K_m(QL/2) + QlK'_m(QL/2)}{I_m(QL/2) + QlI'_m(QL/2)} \times I_m(QR)I_m(QR'),$$

where $R_>$ and $R_<$ are the greater and lesser of $R$ and $R'$. On the measurement surface equation (116) becomes $$g(m, q; \rho, L/2) = g(m, q; L/2, R) = \frac{l}{D_0} g_b(m, q; R), \quad (117)$$

where $$g_b(m, q; R) = \frac{2}{L} \frac{I_m(QR)}{I_m(QL/2) + QlI'_m(QL/2)}, \quad (118)$$

Now we can express the kernel K in terms of the simpler functions $g_b$ as follows:

$$\kappa_\alpha(\omega, m_s, q_s, m_d, q_d; R) = \left(\frac{l+l^*}{D_0}\right)^2 g_b(m_s, q_s; R) g_b(m_d, q_d; R), \quad (119)$$

$$\kappa_D(\omega, m_s, q_s, m_d, q_d; R) = \quad (120)$$
$$\left(\frac{l+l^*}{D_0}\right)^2 \left[\frac{\partial g_b(m_s, q_s; R)}{\partial R} \frac{\partial g_b(m_d, q_d; R)}{\partial R} + \left(q_s q_d + \frac{m_s m_d}{R^2}\right) g_b(m_s, q_s; R) g_b(m_d, q_d; R)\right].$$

Again, the above expression is well-defined in the limits $l \to 0$ and $l \to \infty$. Thus, for example, for purely absorbing boundaries, we have $$\kappa_\alpha(\omega, m_s, q_s, m_d, q_d; R) = \left(\frac{2l^*}{D_0 L}\right)^2 \frac{I_{m_s}[Q(q_s)R]I_{m_d}[Q(q_d)R]}{I_{m_s}[Q(q_s)L/2]I_{m_d}[Q(q_d)L/2]}, \quad (121)$$

$$\kappa_D(\omega, m_s, q_s, m_d, q_d; R) = \quad (122)$$
$$\left(\frac{2l^*}{D_0 L}\right)^2 \left[\frac{Q(q_s)Q(q_d)I'_{m_s}[Q(q_s)R]I'_{m_d}[Q(q_d)R]}{I_{m_s}[Q(q_s)L/2]I_{m_d}[Q(q_d)L/2]} + \left(q_s q_d + \frac{m_s m_d}{R^2}\right)\frac{I_{m_s}[Q(q_s)R]I_{m_d}[Q(q_d)R]}{I_{m_s}[Q(q_s)L/2]I_{m_d}[Q(q_d)L/2]}\right].$$

In the case of purely absorbing boundaries ($l \to \infty$), the analogous expressions are $$\kappa_\alpha(\omega, m_s, q_s, m_d, q_d; R) = \quad (123)$$
$$\left(\frac{2}{D_0 L}\right)^2 \frac{I_{m_s}[Q(q_s)R]I_{m_d}[Q(q_d)R]}{Q(q_s)Q(q_d)I'_{m_s}[Q(q_s)L/2]I'_{m_d}[Q(q_d)L/2]},$$

$$\kappa_D(\omega, m_s, q_s, m_d, q_d; R) = \left(\frac{2}{D_0 L}\right)^2 \left[\frac{I'_{m_s}[Q(q_s)R]I'_{m_d}[Q(q_d)R]}{I'_{m_s}[Q(q_s)L/2]I'_{m_d}[Q(q_d)L/2]} + \frac{R^2 q_s q_d + m_s m_d}{R^2 Q(q_s)Q(q_d)} \frac{I_{m_s}[Q(q_s)R]I_{m_d}[Q(q_d)R]}{I'_{m_s}[Q(q_s)L/2]I'_{m_d}[Q(q_d)L/2]}\right]. \quad (124)$$

5. System Diagram

Figure 4:
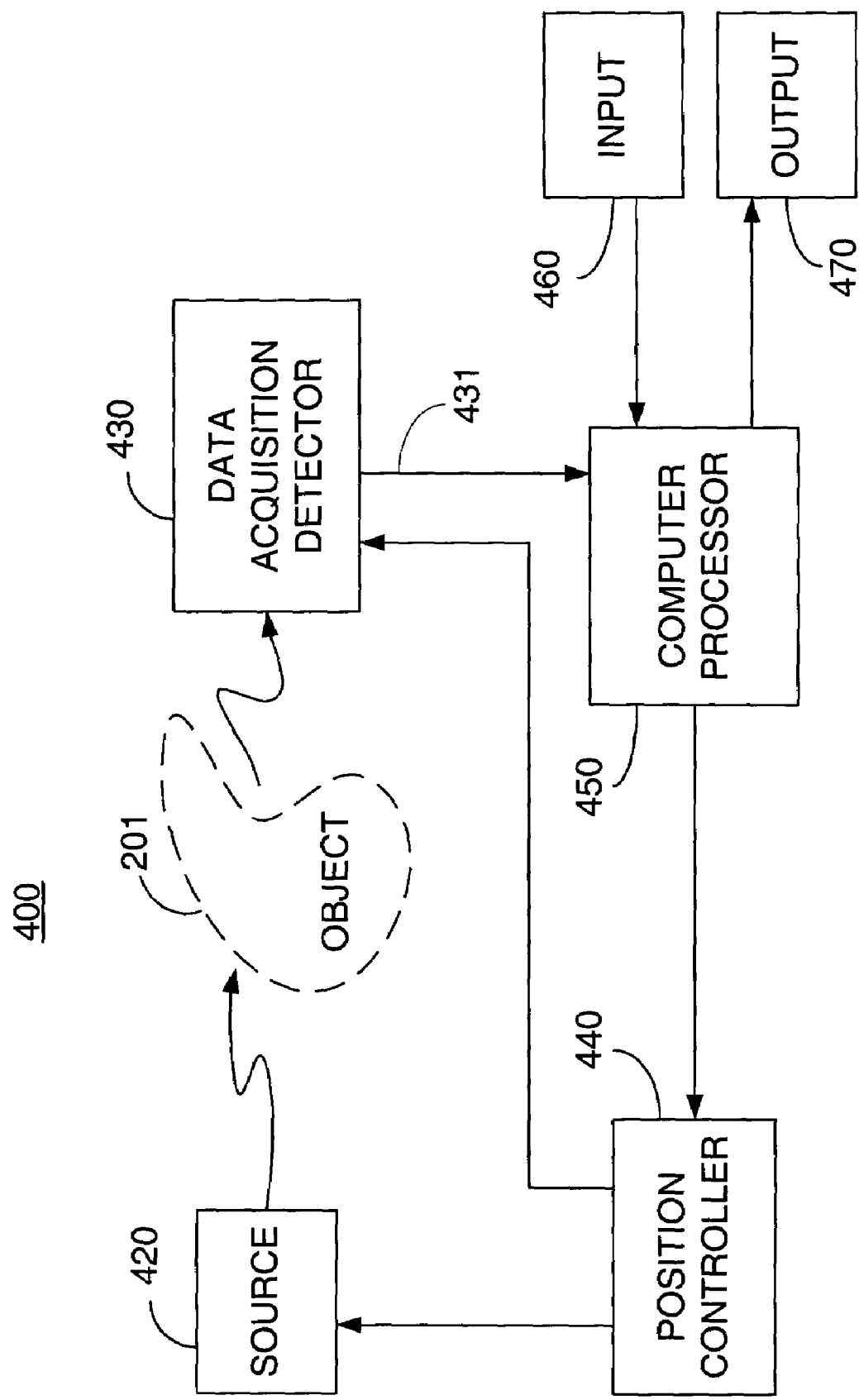
FIG. 4 illustrates a high-level block diagram of an illustrative embodiment of the image reconstruction system in accordance with the present invention.

As depicted in high-level block diagram form in FIG. 4, system 400 is an optical tomography system for generating an image of an scatterer/object using scattering data measured when emanating from an object in response to a source illuminating the object. The measurements which are obtained result in a sampled and limited set of scattering data. In particular, object 201 is shown as being under investigation. System 400 is composed of: source arrangement 420 for probing the object 201; data acquisition detector arrangement 430 for detecting the scattering data corresponding to scattering from object 201 at one or more locations proximate to object 201; position controller 440 for controlling the locations of detector(s) 430 and source(s) 420; and computer processor 450, having associated input device 460 (e.g., a keyboard) and output device 470 (e.g., a graphical display terminal). Computer processor 450 has as its inputs positional information from controller 440 and the measured scattering data from detector(s) 430.

Computer 450 stores a computer program which implements the direct reconstruction algorithm; in particular, the stored program processes the measured scattering data to produce the image of the object under study using a prescribed mathematical algorithm. The algorithm is, generally, based upon both a sampled and limited data set of measurements, with the data in a preferred embodiment being obtained using the paraxial mode of measurement. The algorithm selected for reconstruction depends upon the measurement geometry and the particular source-detector arrangement. Each corresponding algorithm has been described in detail above.

6. Flow Diagram

Figure 5:
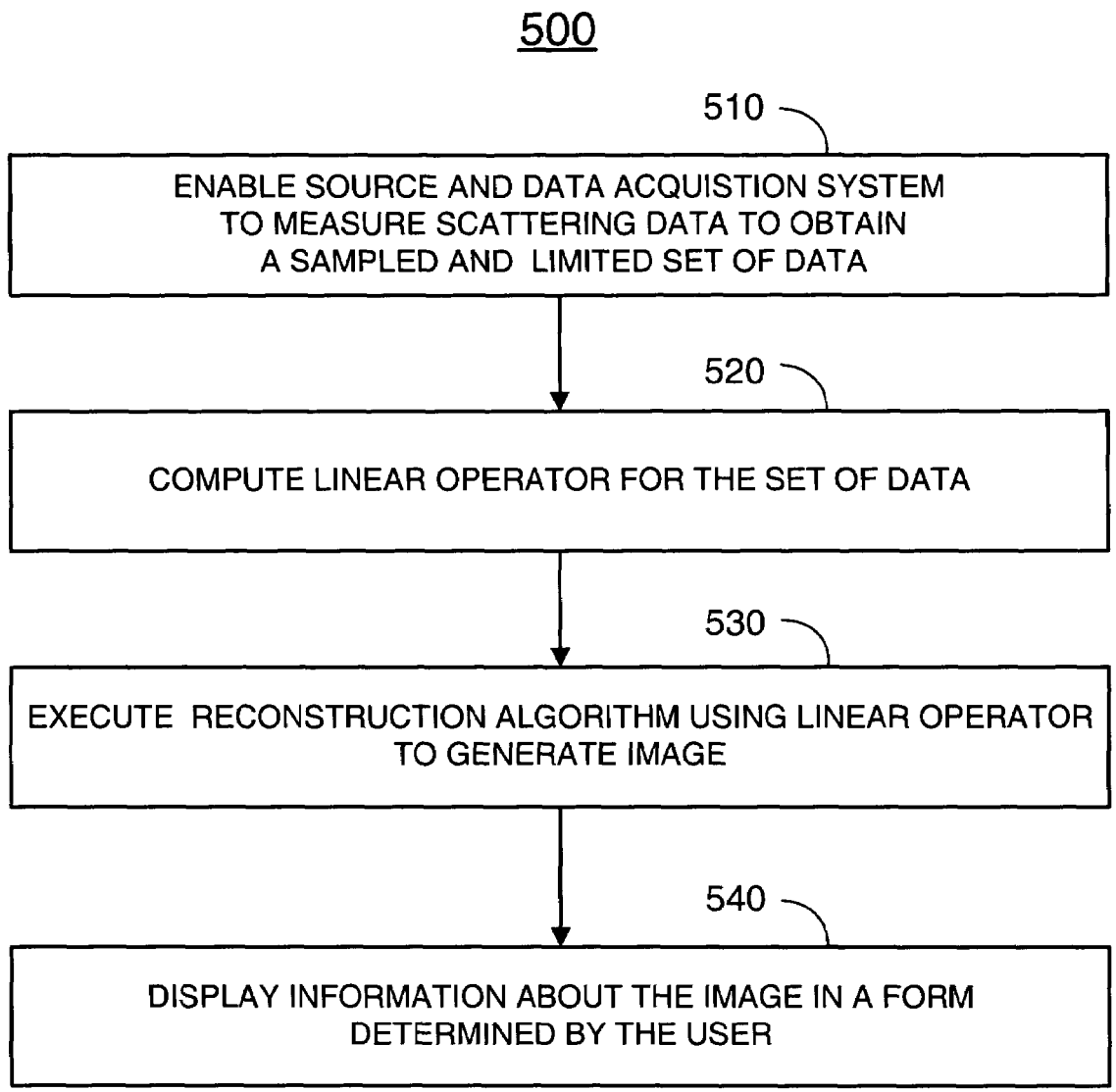
FIG. 5 is a high-level flow diagram of the methodology of the present invention.

An embodiment illustrative of the methodology carried out by the subject matter of the present invention is set forth in high-level flow diagram 500 of FIG. 5 in terms of the illustrative system embodiment shown in FIG. 4. With reference to FIG. 5, the processing effected by block 510 enables source 420 and data acquisition detector 430 so as to measure the scattering data, which is both sampled and limited, emanating from scatterer 201 due to illumination from source 420. These measurements are passed to computer processor 450 from data acquisition detector 430 via bus 431. Next, processing block 520 is invoked to compute the linear operator for the sampled and limited data set. In turn, processing block 530 is operated to execute the reconstruction algorithm using the linear operator formulation. Finally, as depicted by processing block 540, the reconstructed image is provided to output device 470 in a form determined by the user; device 470 may be, for example, a display monitor or a more sophisticated three-dimensional display device.

Figure 6:
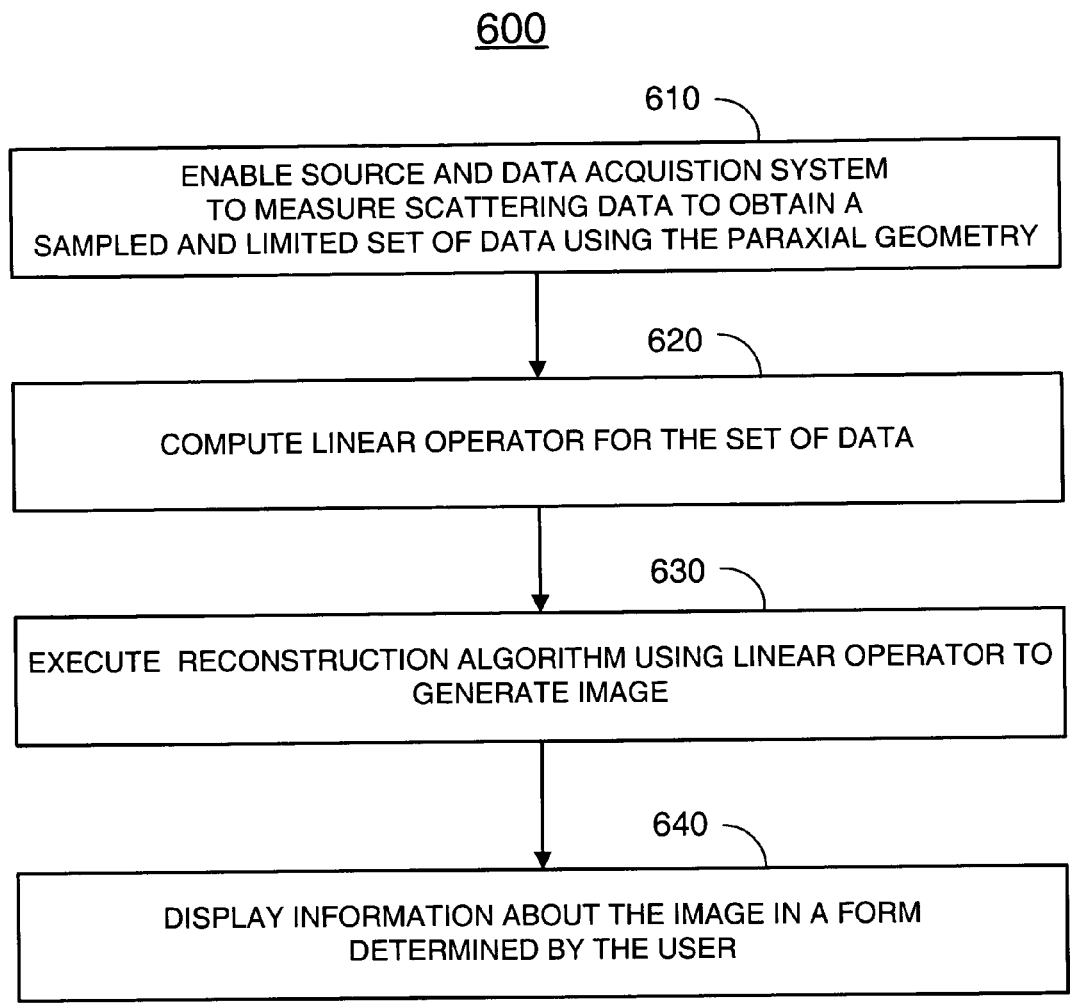
FIG. 6 is another high-level flow diagram of the methodology of the present invention based upon measurements using the paraxial geometry for source and detectors.

Another embodiment illustrative of the methodology carried out by the subject matter of the present invention is set forth in high-level flow diagram 600 of FIG. 6 in terms of the illustrative system embodiment shown in FIG. 4. With reference to FIG. 6, the processing effected by block 610 enables source 420 and data acquisition detector 430 so as to measure the scattering data emanating from scatterer 201 due to illumination from source 420. The scattering data, which is both sampled and limited, is produced using a paraxial measurement configuration. These measurements are passed to computer processor 450 from data acquisition detector 430 via bus 431. Next, processing block 620 is invoked to compute the linear operator for the sampled and limited data set. In turn, processing block 630 is operated to execute the reconstruction algorithm using the linear operator formulation. Finally, as depicted by processing block 640, the reconstructed image is provided to output device 470 in a form determined by the user; device 470 may be, for example, a display monitor or a more sophisticated three-dimensional display device.

Although the present invention has been shown and described in detail herein, those skilled in the art can readily devise many other varied embodiments that still incorporate these teachings. Thus, the previous description merely illustrates the principles of the invention. It will thus be appreciated that those with ordinary skill in the art will be able to devise various arrangements which, although not explicitly described or shown herein, embody principles of the invention and are included within its spirit and scope. Furthermore, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently know equivalents as well as equivalents developed in the future, that is, any elements developed that perform the function, regardless of structure.

In addition, it will be appreciated by those with ordinary skill in the art that the block diagrams herein represent conceptual views of illustrative circuitry embodying the principles of the invention.

What is claimed is:

1. A method for generating an image of an object comprising
    irradiating the object with a source of radiation,
    measuring both a sampled and limited data set of transmitted intensities wherein said transmitted intensities are related to at least one coefficient characterizing the image by an integral operator, and
    directly reconstructing the image by executing a prescribed mathematical algorithm, determined with reference to said integral operator, on said transmitted intensities.

2. The method as recited in claim 1 wherein said at least one coefficient is a diffusion coefficient.

3. The method as recited in claim 1 wherein said at least one coefficient is an absorption coefficient.

4. The method as recited in claim 1 wherein said at least one coefficient includes both an absorption coefficient and a diffusion coefficient.

5. A method for generating an image of an object comprising
    irradiating the object with a source of radiation,
    measuring both a sampled and limited data set of transmitted intensities in a paraxial arrangement wherein said transmitted intensities are related to at least one coefficient characterizing the image by an integral operator, and
    directly reconstructing the image by executing a prescribed mathematical algorithm, determined with reference to said integral operator, on said transmitted intensities.

6. The method as recited in claim 5 wherein said at least one coefficient is a diffusion coefficient.

7. The method as recited in claim 5 wherein said at least one coefficient is an absorption coefficient.

8. The method as recited in claim 5 wherein said at least one coefficient includes both an absorption coefficient and a diffusion coefficient.

9. The method as recited in claim 5 wherein the source of radiation is a single source and the paraxial arrangement is composed of the single source and an on-axis detector and at least one off-axis detector and the measuring includes moving the arrangement proximate to the object to obtain the data set of transmitted intensities.

10. A system for generating an image of an object comprising
    a source of radiation for irradiating the object,
    a detector arrangement for measuring both a sampled and limited data set of transmitted intensities wherein said transmitted intensities are related to at least one coefficient characterizing the image by an integral operator, and
    a reconstructor for directly reconstructing the image by executing a prescribed mathematical algorithm, determined with reference to said integral operator, on said transmitted intensities.

11. The system as recited in claim 10 wherein said at least one coefficient is a diffusion coefficient.

12. The system as recited in claim 10 wherein said at least one coefficient is an absorption coefficient.

13. The system as recited in claim 10 wherein said at least one coefficient includes both an absorption coefficient and a diffusion coefficient.

14. A system for generating an image of an object comprising
    a source of radiation for irradiating the object,
    a detector arrangement for measuring both a sampled and limited data set of transmitted intensities in a paraxial arrangement wherein said transmitted intensities are related to at least one coefficient characterizing the image by an integral operator, and
    a reconstructor for directly reconstructing the image by executing a prescribed mathematical algorithm, determined with reference to said integral operator, on said transmitted intensities.

15. The system as recited in claim 14 wherein said at least one coefficient is a diffusion coefficient.

16. The system as recited in claim 14 wherein said at least one coefficient is an absorption coefficient.

17. The system as recited in claim 14 wherein said at least one coefficient includes both an absorption coefficient and a diffusion coefficient.

18. The system as recited in claim 14 wherein the source of radiation is a single source and the paraxial arrangement is composed of the single source and an on-axis detector and at least one off-axis detector.

* * * * *